US011950261B2

(12) United States Patent
Akkarakaran et al.

(10) Patent No.: US 11,950,261 B2
(45) Date of Patent: Apr. 2, 2024

(54) SIDELINK CARRIER AGGREGATION SET-UP, ACTIVATION, AND DEACTIVATION

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/401,188

(22) Filed: Aug. 12, 2021

(65) Prior Publication Data
US 2022/0053481 A1 Feb. 17, 2022

Related U.S. Application Data

(60) Provisional application No. 63/065,989, filed on Aug. 14, 2020.

(51) Int. Cl.
H04W 72/51 (2023.01)
H04L 5/00 (2006.01)
H04W 76/14 (2018.01)

(52) U.S. Cl.
CPC ........... H04W 72/51 (2023.01); H04L 5/0098 (2013.01); H04W 76/14 (2018.02)

(58) Field of Classification Search
CPC . H04W 72/51; H04W 76/14; H04W 72/0453; H04W 72/20; H04W 92/18;
(Continued)

(56) References Cited

U.S. PATENT DOCUMENTS

2016/0100345 A1    4/2016  Thangarasa et al.
2020/0221467 A1*   7/2020  Huang ................ H04W 72/542

FOREIGN PATENT DOCUMENTS

EP    3125626 A1 *  2/2017  ............ H04W 48/16
EP    3125626 A1    2/2017
(Continued)

OTHER PUBLICATIONS

3GPP TS 36.331 Radio Resource Control (RRC); Protocol specification, V15.10.0 (Jul. 2020) (Year: 2020).*
(Continued)

Primary Examiner — Ayaz R Sheikh
Assistant Examiner — David Zhijun Sun
(74) Attorney, Agent, or Firm — Arent Fox LLP

(57) ABSTRACT

This disclosure relates to the set-up, activation, and deactivation of sidelink carrier aggregation, and includes a method and apparatus for transmitting or receiving a reference signal to a second UE on a designated sidelink component carrier as part of an initial beam scanning procedure; receiving a configuration message from a network entity indicating one or more additional sidelink component carriers for the first UE and the second UE; and communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

14 Claims, 19 Drawing Sheets

(58) Field of Classification Search
CPC .... H04W 72/25; H04L 5/0098; H04L 5/0048;
H04L 5/0023; H04L 5/0033; H04L
5/0064; H04L 5/001; H04B 7/0695;
H04B 7/06954; H04B 7/088
See application file for complete search history.

(56) References Cited

FOREIGN PATENT DOCUMENTS

| EP | 3471477 A1 | 4/2019 | | |
|---|---|---|---|---|
| EP | 3668235 A1 | 6/2020 | | |
| KR | 20200075772 A | 6/2020 | | |
| WO | WO-2019023857 A1 * | 2/2019 | ............ | H04W 72/04 |
| WO | 2019196829 A1 | 10/2019 | | |
| WO | WO-2019196829 A1 * | 10/2019 | ........... | H04B 17/309 |
| WO | WO-2021114043 A1 * | 6/2021 | | |

OTHER PUBLICATIONS

Partial International Search Report—PCT/US2021/045985—ISA/EPO—dated Dec. 2, 2021.
International Search Report and Written Opinion—PCT/US2021/045985—ISA/EPO—dated Apr. 7, 2022.

* cited by examiner

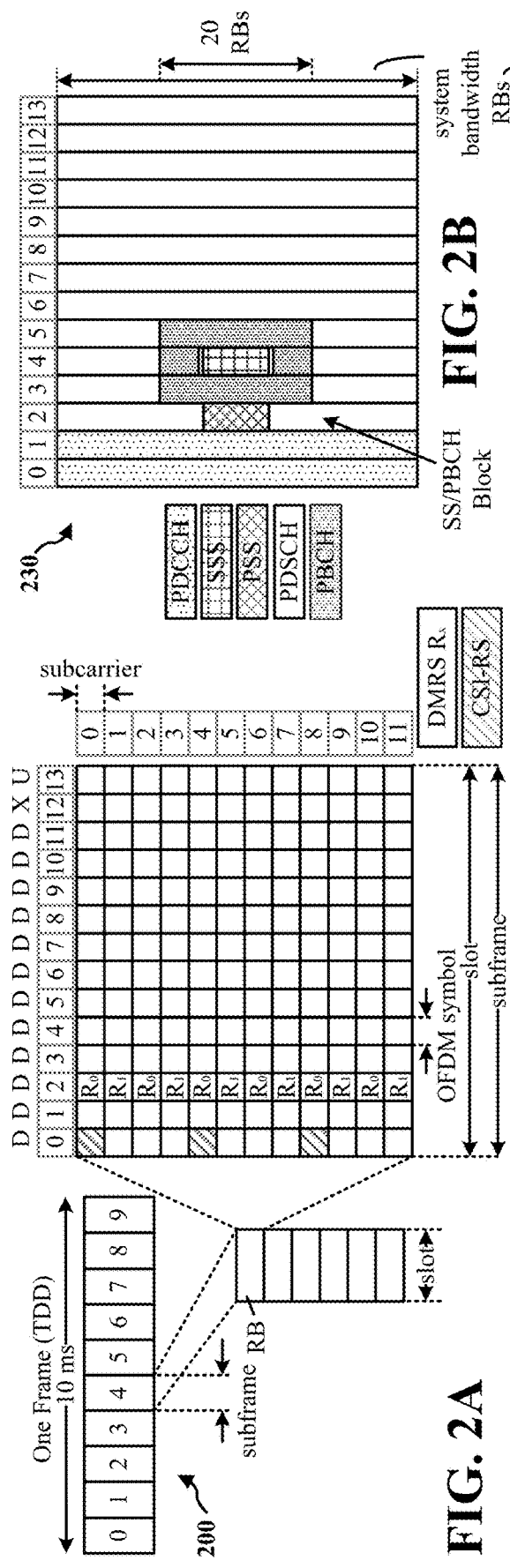
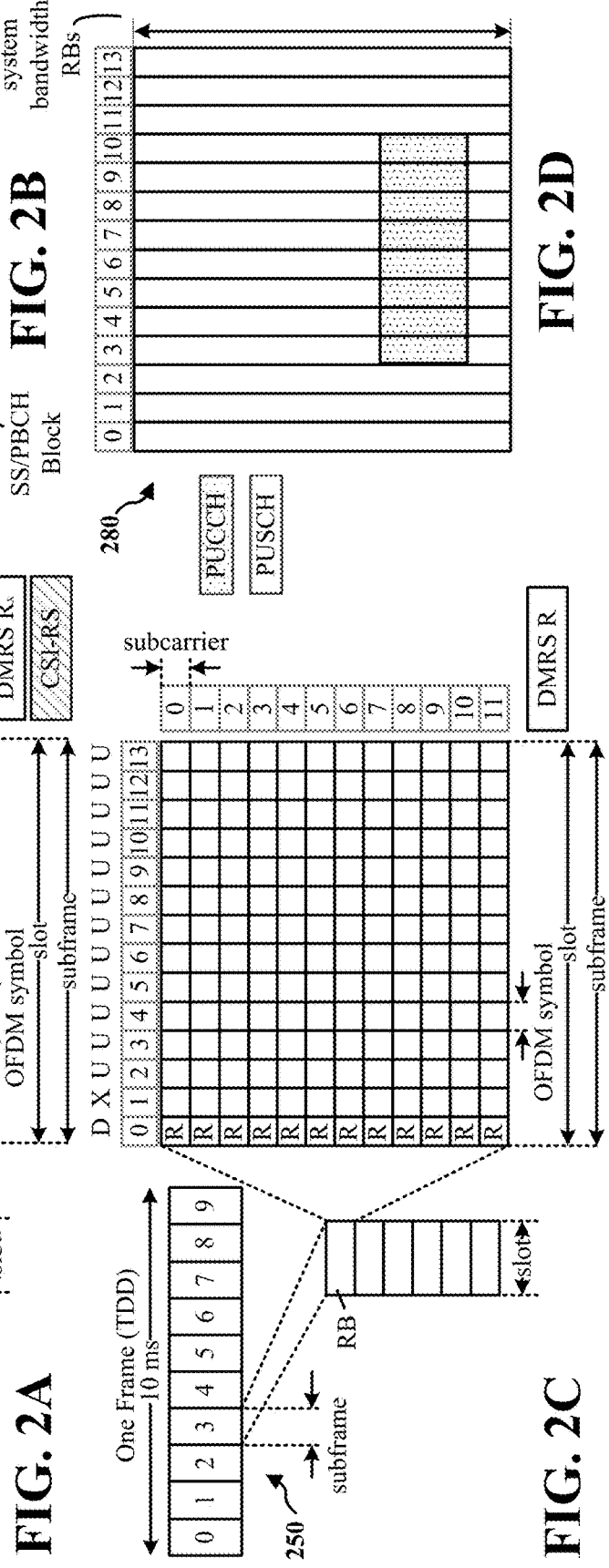
FIG. 2A
FIG. 2B
FIG. 2C
FIG. 2D

SIDELINK CARRIER AGGREGATION SET-UP, ACTIVATION, AND DEACTIVATION

CROSS-REFERENCE TO RELATED APPLICATION(S)

The present application claims benefit of U.S. Provisional Application No. 63/065,989 entitled "SIDELINK CARRIER AGGREGATION SET-UP, ACTIVATION, AND DEACTIVATION" filed Aug. 14, 2020, which is assigned to the assignee hereof and hereby expressly incorporated by reference herein.

BACKGROUND

The present disclosure relates generally to communication systems, and more particularly, to enhancements of sidelink carrier aggregation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a first user equipment (UE), comprising transmitting a reference signal to a second UE on a designated sidelink component carrier as part of an initial beam scanning procedure; receiving a configuration message from a network entity indicating one or more additional sidelink component carriers for the first UE and the second UE; and communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In a further example, an apparatus for wireless communication at a first UE is provided that includes a memory and one or more processors coupled with the memory. The memory and the one or more processors are configured to transmit a reference signal to a second UE on a designated sidelink component carrier as part of an initial beam scanning procedure; receive a configuration message from a network entity indicating one or more additional sidelink component carriers for the first UE and the second UE; and communicate with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In another aspect, an apparatus for wireless communication at a first UE is provided that includes means for transmitting a reference signal to a second UE on a designated sidelink component carrier as part of an initial beam scanning procedure; means for receiving a configuration message from a network entity indicating one or more additional sidelink component carriers for the first UE and the second UE; and means for communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In yet another aspect, a non-transitory computer-readable medium at a first UE is provided including code executable by one or more processors to transmit a reference signal to a second UE on a designated sidelink component carrier as part of an initial beam scanning procedure; receive a configuration message from a network entity indicating one or more additional sidelink component carriers for the first UE and the second UE; and communicate with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In this example, the method, apparatus, and non-transitory computer-readable medium further include transmitting or receiving a sidelink synchronization signal block (SSB) to or from the second UE on the designated sidelink component carrier; and establishing a sidelink beam pairing on the designated sidelink component carrier with the second UE based on the sidelink SSB.

In this example, the method, apparatus, and non-transitory computer-readable medium further include the one or more additional sidelink component carriers for the first UE and the second UE are configured based on one or more communication capabilities for each of the first UE and the second UE.

In this example, the method, apparatus, and non-transitory computer-readable medium further include transmitting a capability message to the network entity, the capability message indicating one or more communication capabilities of the first UE; and wherein receiving the configuration message from the network entity further comprises receiving the configuration message in response to transmitting the capability message, wherein the capability message includes multi-component carrier configurations supported by the first UE based on performing the initial beam scanning procedure with the second UE, wherein the capability message corresponds to a Uu radio resource configuration (RRC) message, wherein the one or more communication capabilities correspond to a number of component carriers supported by the first UE.

According to another example, a method of wireless communication at a network entity, comprising receiving a first capability message from a first UE and a second capability message from the second UE, wherein each of the first capability message and the second capability message respectively indicate one or more communication capabilities of the first UE and the second UE; and transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In a further example, an apparatus for wireless communication at a network entity is provided that includes a memory and one or more processors coupled with the memory. The memory and the one or more processors are configured to receive a first capability message from a first UE and a second capability message from the second UE, wherein each of the first capability message and the second capability message respectively indicate one or more communication capabilities of the first UE and the second UE; and transmit a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In another aspect, an apparatus for wireless communication at a network entity is provided that includes means for receiving a first capability message from a first UE and a second capability message from the second UE, wherein each of the first capability message and the second capability message respectively indicate one or more communication capabilities of the first UE and the second UE; and means for transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In yet another aspect, a non-transitory computer-readable medium at a network entity is provided including code executable by one or more processors to receive a first capability message from a first UE and a second capability message from the second UE, wherein each of the first capability message and the second capability message respectively indicate one or more communication capabilities of the first UE and the second UE; and transmit a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In this example, the method, apparatus, and non-transitory computer-readable medium further include the one or more additional sidelink component carriers for the sidelink communication between the first UE and the second UE are based on a number of component carriers supported by each of the first UE and the second UE.

In this example, the method, apparatus, and non-transitory computer-readable medium further include each of the first capability message and the second capability message includes a preferred multi-component carrier configuration based on an initial beam scanning procedure between the first UE and the second UE.

In this example, the method, apparatus, and non-transitory computer-readable medium further include each of the first capability message and the second capability message corresponds to a respective Uu radio resource configuration (RRC).

In this example, the method, apparatus, and non-transitory computer-readable medium further include the one or more communication capabilities corresponds to a number of component carriers supported by the first UE.

According to another example, a method of wireless communication at a first UE, comprising receiving one or more capabilities of a second UE for sidelink communication, wherein the first UE and the second UE are out of coverage of a network entity; transmitting, to the second UE, information about one or more additional sidelink component carriers; and communicating with the second UE via a sidelink corresponding to the designated sidelink component carrier and the one or more additional sidelink component carriers.

In a further example, an apparatus for wireless communication at a first UE is provided that includes a memory and one or more processors coupled with the memory. The memory and the one or more processors are configured to receive one or more capabilities of a second UE for sidelink communication, wherein the first UE and the second UE are out of coverage of a network entity; transmit, to the second UE, information about one or more additional sidelink component carriers; and communicate with the second UE via a sidelink corresponding to the designated sidelink component carrier and the one or more additional sidelink component carriers.

In another aspect, an apparatus for wireless communication at a first UE is provided that includes means for receiving one or more capabilities of a second UE for sidelink communication, wherein the first UE and the second UE are out of coverage of a network entity; means for transmitting, to the second UE, information about one or more additional sidelink component carriers; and means for communicating with the second UE via a sidelink corresponding to the designated sidelink component carrier and the one or more additional sidelink component carriers.

In yet another aspect, a non-transitory computer-readable medium at a first UE is provided including code executable by one or more processors to receive one or more capabilities of a second UE for sidelink communication, wherein the first UE and the second UE are out of coverage of a network entity; transmit, to the second UE, information about one or more additional sidelink component carriers; and communicate with the second UE via a sidelink corresponding to the designated sidelink component carrier and the one or more additional sidelink component carriers.

In this example, the method, apparatus, and non-transitory computer-readable medium further include transmitting or receiving a sidelink SSB to or from the second UE on the designated sidelink component carrier; and establishing a sidelink beam pairing on the designated sidelink component carrier between the first UE and the second UE based on the sidelink SSB.

In this example, the method, apparatus, and non-transitory computer-readable medium further include determining one or more additional sidelink component carriers for the first UE and the second UE.

According to another example, a method of wireless communication at a first UE, comprising transmitting a reference signal to a second UE on a designated sidelink component carrier as part of an initial beam scanning procedure; determining one or more additional sidelink component carriers for the first UE and the second UE; and communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In a further example, an apparatus for wireless communication at a first UE is provided that includes a memory and one or more processors coupled with the memory. The memory and the one or more processors are configured to transmit a reference signal to a second UE on a designated sidelink component carrier as part of an initial beam scanning procedure; determine one or more additional sidelink component carriers for the first UE and the second UE; and communicate with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In another aspect, an apparatus for wireless communication at a first UE is provided that includes means for transmitting a reference signal to a second UE on a designated sidelink component carrier as part of an initial beam scanning procedure; means for determining one or more additional sidelink component carriers for the first UE and the second UE; and means for communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In yet another aspect, a non-transitory computer-readable medium at a first UE is provided including code executable by one or more processors to transmit a reference signal to a second UE on a designated sidelink component carrier as part of an initial beam scanning procedure; determine one or more additional sidelink component carriers for the first UE and the second UE; and communicate with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In this example, the method, apparatus, and non-transitory computer-readable medium further include receiving a sidelink SSB from the second UE on the designated sidelink component carrier; and establishing a sidelink beam pairing on the designated sidelink component carrier with the second UE based on the sidelink SSB.

According to another example, a method of wireless communication at a first UE, comprising receiving an indication to at least one of activate or deactivate multiple sidelink component carriers; and activating one or more sidelink component carriers in response to the indication indicating activation.

In a further example, an apparatus for wireless communication at a first UE is provided that includes a memory and one or more processors coupled with the memory. The memory and the one or more processors are configured to receive an indication to at least one of activate or deactivate multiple sidelink component carriers; and activate one or more sidelink component carriers in response to the indication indicating activation.

In another aspect, an apparatus for wireless communication at a first UE is provided that includes means for transmitting a reference signal to a second UE on a designated sidelink component carrier as part of an initial beam scanning procedure; means for receiving an indication to at least one of activate or deactivate multiple sidelink component carriers; and means for activating one or more sidelink component carriers in response to the indication indicating activation.

In yet another aspect, a non-transitory computer-readable medium at a first UE is provided including code executable by one or more processors to receive an indication to at least one of activate or deactivate multiple sidelink component carriers; and activate one or more sidelink component carriers in response to the indication indicating activation.

In this example, the method, apparatus, and non-transitory computer-readable medium further include deactivating one or more sidelink component carriers in response to the indication indicating deactivation.

In this example, the method, apparatus, and non-transitory computer-readable medium further include the indication corresponds to at least one of a media access control (MAC) control element (CE), a downlink control information (DCI), or a sidelink control information (SCI).

In this example, the method, apparatus, and non-transitory computer-readable medium further include receiving the indication to at least one of activate or deactivate the multiple sidelink component carriers further comprises receiving the at least one of the MACE CE or the DCI on a downlink channel from a network entity.

In this example, the method, apparatus, and non-transitory computer-readable medium further include receiving the indication to at least one of activate or deactivate the multiple sidelink component carriers further comprises receiving the at least one of the MACE CE or the SCI on a sidelink component carrier from a second UE.

In this example, the method, apparatus, and non-transitory computer-readable medium further include the at least one of the MAC CE, the DCI or the SCI include a payload for indicating one or more sidelink component carriers to be at least one of activated or deactivated.

In this example, the method, apparatus, and non-transitory computer-readable medium further include the at least one of the MAC CE, the DCI or the SCI implicitly indicate one or more sidelink component carriers to be at least one of activated or deactivated.

In this example, the method, apparatus, and non-transitory computer-readable medium further include performing the at least one of activation or deactivation on the one or more sidelink component carriers further comprises performing activation on the one or more sidelink component carriers, wherein activation enables sidelink communications with a second UE on the one or more sidelink component carriers.

In this example, the method, apparatus, and non-transitory computer-readable medium further include performing the at least one of activation or deactivation on the one or more sidelink component carriers further comprises performing deactivation on the one or more sidelink component carriers, wherein deactivation disables sidelink communications with a second UE on the one or more sidelink component carriers.

According to another example, a method of wireless communication at a second UE, comprising transmitting, to a first UE, one or more capabilities of the second UE for sidelink communication, wherein the first UE and the second UE are out of coverage of a network entity; receiving, from the first UE, information about one or more additional sidelink component carriers; and communicating with the second UE via a sidelink corresponding to the designated sidelink component carrier and all of the one or more additional sidelink component carriers.

In a further example, an apparatus for wireless communication at a second UE is provided that includes a memory, and one or more processors coupled with the memory. The memory and the one or more processors are configured to transmit, to a first UE, one or more capabilities of the second UE for sidelink communication, wherein the first UE and the second UE are out of coverage of a network entity; receive, from the first UE, information about one or more additional sidelink component carriers; and communicate with the second UE via a sidelink corresponding to the designated sidelink component carrier and all of the one or more additional sidelink component carriers.

In another aspect, an apparatus for wireless communication at a second UE is provided that includes means for transmitting, to a first UE, one or more capabilities of the second UE for sidelink communication, wherein the first UE and the second UE are out of coverage of a network entity; means for receiving, from the first UE, information about one or more additional sidelink component carriers; and means for communicating with the second UE via a sidelink corresponding to the designated sidelink component carrier and all of the one or more additional sidelink component carriers.

In yet another aspect, a non-transitory computer-readable medium at a second UE is provided including code executable by one or more processors to transmit, to a first UE, one or more capabilities of the second UE for sidelink communication, wherein the first UE and the second UE are out of coverage of a network entity; receive, from the first UE, information about one or more additional sidelink component carriers; and communicate with the second UE via a sidelink corresponding to the designated sidelink component carrier and all of the one or more additional sidelink component carriers.

In this example, the method, apparatus, and non-transitory computer-readable medium further include transmitting or receiving a sidelink SSB to the first UE on the designated sidelink component carrier; and establishing a sidelink beam pairing on the designated sidelink component carrier with the first UE based on the sidelink SSB.

In this example, the method, apparatus, and non-transitory computer-readable medium further include determining one or more additional sidelink component carriers for the first UE and the second UE; and wherein communicating with the second UE via the sidelink corresponding to the designated sidelink component carrier further comprises communicating information of the one or more additional sidelink component carriers with the first UE via one or more sidelink component carriers corresponding to at least one of the designated sidelink component carrier or the one or more additional sidelink component carriers.

According to another example, a method of wireless communication at a first UE, comprising transmitting an indication to at least one of activate or deactivate multiple sidelink component carriers; and activating one or more sidelink component carriers in response to the indication indicating activation.

In a further example, an apparatus for wireless communication at a first UE is provided that includes a memory, and one or more processors coupled with the memory. The memory and the one or more processors are configured to transmit an indication to at least one of activate or deactivate multiple sidelink component carriers; and activate one or more sidelink component carriers in response to the indication indicating activation.

In another aspect, an apparatus for wireless communication at a first UE is provided that includes means for transmitting an indication to at least one of activate or deactivate multiple sidelink component carriers; and means for activating one or more sidelink component carriers in response to the indication indicating activation.

In yet another aspect, a non-transitory computer-readable medium at a first UE is provided including code executable by one or more processors to transmit an indication to at least one of activate or deactivate multiple sidelink component carriers; and activate one or more sidelink component carriers in response to the indication indicating activation.

In this example, the method, apparatus, and non-transitory computer-readable medium further include deactivating one or more sidelink component carriers in response to the indication indicating deactivation.

In this example, the method, apparatus, and non-transitory computer-readable medium further include the indication corresponds to at least one of a MAC CE, a DCI, or a SCI.

In this example, the method, apparatus, and non-transitory computer-readable medium further include receiving the indication to at least one of activate or deactivate the multiple sidelink component carriers further comprises receiving the at least one of the MACE CE or the DCI on a downlink channel from a network entity.

According to another example, a method of wireless communication at a first UE, comprising performing an initial beam scanning procedure with a second UE in a designated sidelink component carrier, wherein the first UE and the second UE are configured in coverage with a network entity; receiving a configuration message from the network entity indicating one or more additional sidelink component carriers for the first UE and the second UE; and communicating with the second UE via a sidelink corresponding to at least one of the one or more additional sidelink component carriers and the designated sidelink component carrier based on the configuration message.

In a further example, an apparatus for wireless communication at a first UE is provided that includes a memory, and one or more processors coupled with the memory. The memory and the one or more processors are configured to perform an initial beam scanning procedure with a second UE in a designated sidelink component carrier, wherein the first UE and the second UE are configured in coverage with a network entity; receive a configuration message from the network entity indicating one or more additional sidelink component carriers for the first UE and the second UE; and communicate with the second UE via a sidelink corresponding to at least one of the one or more additional sidelink component carriers and the designated sidelink component carrier based on the configuration message.

In another aspect, an apparatus for wireless communication at a first UE is provided that includes means for performing an initial beam scanning procedure with a second UE in a designated sidelink component carrier, wherein the first UE and the second UE are configured in coverage with a network entity; means for receiving a configuration message from the network entity indicating one or more additional sidelink component carriers for the first UE and the second UE; and means for communicating with the second UE via a sidelink corresponding to at least one of the one or more additional sidelink component carriers and the designated sidelink component carrier based on the configuration message.

In yet another aspect, a non-transitory computer-readable medium at a first UE is provided including code executable by one or more processors to perform an initial beam scanning procedure with a second UE in a designated sidelink component carrier, wherein the first UE and the second UE are configured in coverage with a network entity; receive a configuration message from the network entity indicating one or more additional sidelink component carriers for the first UE and the second UE; and communicate with the second UE via a sidelink corresponding to at least one of the one or more additional sidelink component carriers and the designated sidelink component carrier based on the configuration message.

According to another example, a method of wireless communication at a network entity, comprising determining one or more additional sidelink component carriers for sidelink communication between a first UE and a second UE, wherein the first UE and the second UE are configured in coverage with the network entity; and transmitting a configuration message to at least one of the first UE or the second UE, the configuration message indicating the additional sidelink component carriers and being configured to enable the sidelink communication between the first UE and the second UE based on one of the additional sidelink component carriers.

In a further example, an apparatus for wireless communication at a network entity is provided that includes a memory, and one or more processors coupled with the memory. The memory and the one or more processors are configured to determine one or more additional sidelink component carriers for sidelink communication between a first UE and a second UE, wherein the first UE and the second UE are configured in coverage with the network entity; and transmit a configuration message to at least one of the first UE or the second UE, the configuration message indicating the additional sidelink component carriers and being configured to enable the sidelink communication between the first UE and the second UE based on one of the additional sidelink component carriers.

In another aspect, an apparatus for wireless communication at a network entity is provided that includes means for determining one or more additional sidelink component carriers for sidelink communication between a first UE and a second UE, wherein the first UE and the second UE are configured in coverage with the network entity; and means for transmitting a configuration message to at least one of the first UE or the second UE, the configuration message indicating the additional sidelink component carriers and being configured to enable the sidelink communication between the first UE and the second UE based on one of the additional sidelink component carriers.

In yet another aspect, a non-transitory computer-readable medium at a network entity is provided including code executable by one or more processors to determine one or more additional sidelink component carriers for sidelink communication between a first UE and a second UE, wherein the first UE and the second UE are configured in coverage with the network entity; and transmit a configuration message to at least one of the first UE or the second UE, the configuration message indicating the additional sidelink component carriers and being configured to enable the sidelink communication between the first UE and the second UE based on one of the additional sidelink component carriers.

According to another example, a method of wireless communication at a first UE, comprising performing an initial beam scanning procedure with a second UE in a designated sidelink component carrier, wherein the first UE and the second UE are configured out of coverage with a network entity; and communicating with the second UE via a sidelink corresponding to the designated sidelink component carrier.

In a further example, an apparatus for wireless communication at a first UE is provided that includes a memory, and one or more processors coupled with the memory. The memory and the one or more processors are configured to perform an initial beam scanning procedure with a second UE in a designated sidelink component carrier, wherein the first UE and the second UE are configured out of coverage with a network entity; and communicate with the second UE via a sidelink corresponding to the designated sidelink component carrier.

In another aspect, an apparatus for wireless communication at a first UE is provided that includes means for performing an initial beam scanning procedure with a second UE in a designated sidelink component carrier, wherein the first UE and the second UE are configured out of coverage with a network entity; and means for communicating with the second UE via a sidelink corresponding to the designated sidelink component carrier.

In yet another aspect, a non-transitory computer-readable medium at a first UE is provided including code executable by one or more processors to perform an initial beam scanning procedure with a second UE in a designated sidelink component carrier, wherein the first UE and the second UE are configured out of coverage with a network entity; and communicate with the second UE via a sidelink corresponding to the designated sidelink component carrier.

According to another example, a method of wireless communication at a first UE, comprising performing an initial beam scanning procedure with a second UE in a designated sidelink component carrier, wherein the first UE is configured in coverage with a network entity; determining additional sidelink component carriers for the first UE and the second UE, the second UE being out of coverage with the network entity; and communicating information regarding the one or more additional sidelink component carriers with the second UE via a sidelink corresponding to at least one of the additional sidelink component carriers and the designated sidelink component carrier.

In a further example, an apparatus for wireless communication at a first UE is provided that includes a memory, and one or more processors coupled with the memory. The memory and the one or more processors are configured to perform an initial beam scanning procedure with a second UE in a designated sidelink component carrier, wherein the first UE is configured in coverage with a network entity; determine additional sidelink component carriers for the first UE and the second UE, the second UE being out of coverage with the network entity; and communicate the one or more additional sidelink component carriers with the second UE via a sidelink corresponding to at least one of the additional sidelink component carriers and the designated sidelink component carrier.

In another aspect, an apparatus for wireless communication at a first UE is provided that includes means for performing an initial beam scanning procedure with a second UE in a designated sidelink component carrier, wherein the first UE is configured in coverage with a network entity; means for determining additional sidelink component carriers for the first UE and the second UE, the second UE being out of coverage with the network entity; and means for communicating the one or more additional sidelink component carriers with the second UE via a sidelink corresponding to at least one of the additional sidelink component carriers and the designated sidelink component carrier.

In yet another aspect, a non-transitory computer-readable medium at a first UE is provided including code executable by one or more processors to perform an initial beam scanning procedure with a second UE in a designated sidelink component carrier, wherein the first UE is configured in coverage with a network entity; determine additional sidelink component carriers for the first UE and the second UE, the second UE being out of coverage with the network entity; and communicate the one or more additional sidelink component carriers with the second UE via a sidelink corresponding to at least one of the additional sidelink component carriers and the designated sidelink component carrier.

According to another example, a method of wireless communication at a first UE, comprising receiving an indication to at least one of activate or deactivate one or more sidelink component carriers; determining one or more sidelink component carriers to at least one of activate or deactivate based on the indication; and performing the at least one of activation or deactivation on the one or more sidelink component carriers.

In a further example, an apparatus for wireless communication at a first UE is provided that includes a memory, and one or more processors coupled with the memory. The memory and the one or more processors are configured to receive an indication to at least one of activate or deactivate one or more sidelink component carriers; determine one or more sidelink component carriers to at least one of activate or deactivate based on the indication; and perform the at least one of activation or deactivation on the one or more sidelink component carriers.

In another aspect, an apparatus for wireless communication at a first UE is provided that includes means for receiving an indication to at least one of activate or deactivate one or more sidelink component carriers; means for determining one or more sidelink component carriers to at least one of activate or deactivate based on the indication; and means for performing the at least one of activation or deactivation on the one or more sidelink component carriers.

In yet another aspect, a non-transitory computer-readable medium at a first UE is provided including code executable by one or more processors to receive an indication to at least one of activate or deactivate one or more sidelink component carriers; determine one or more sidelink component carriers to at least one of activate or deactivate based on the indication; and perform the at least one of activation or deactivation on the one or more sidelink component carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1 in accordance with one or more aspects of the present disclosure.

DETAILED DESCRIPTION

Figure 1:
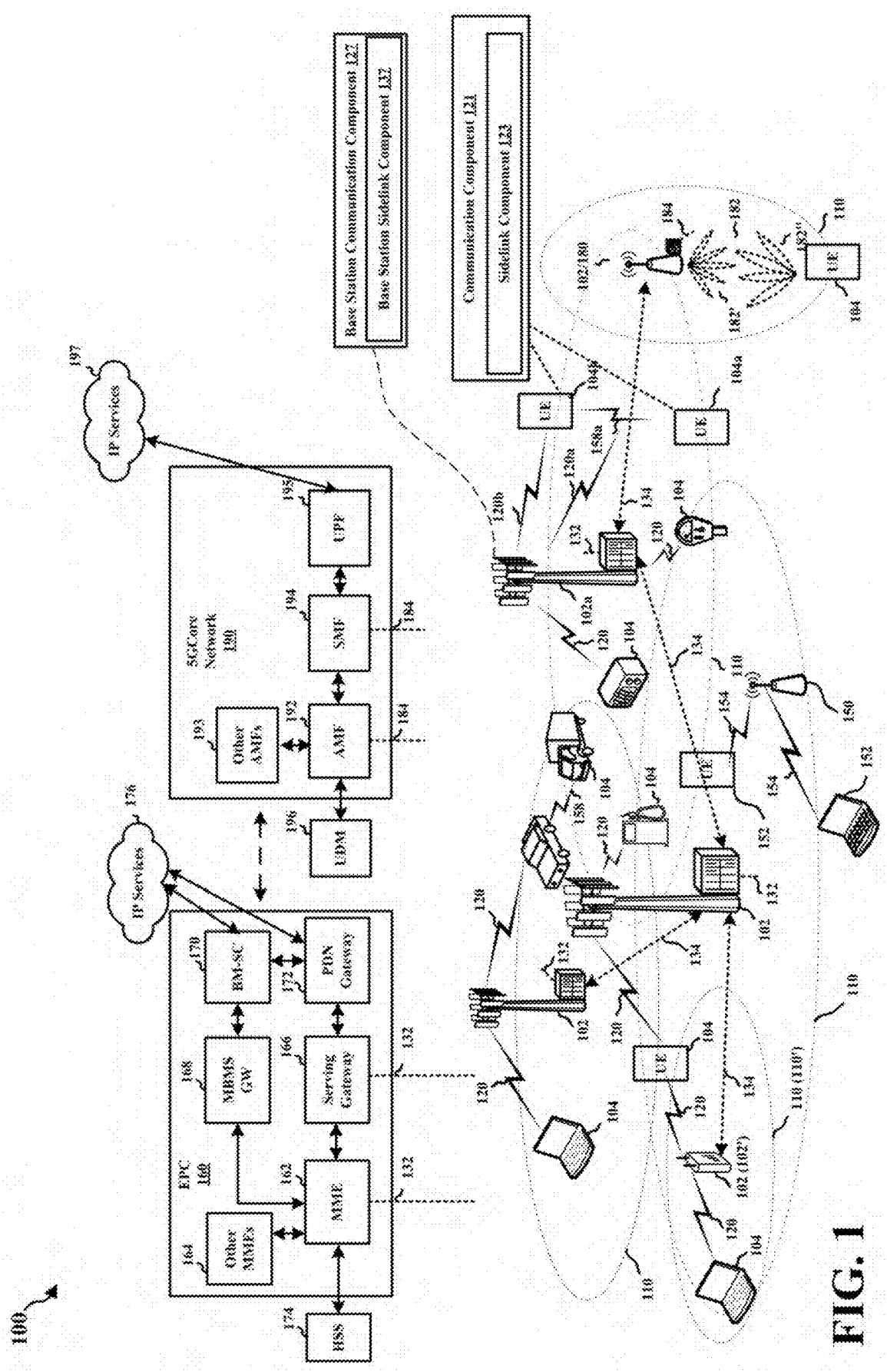
FIG. 1 is a schematic diagram of an example of a wireless communications system and an access network in accordance with one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink communications, which includes a first user equipment (UE) communicating over a sidelink channel with a second UE. The sidelink may include a physical sidelink shared channel (PSSCH) and a physical sidelink control channel (PSCCH). The PSSCH may carry sidelink data between the first UE and the second UE.

Specifically, the present disclosure relates to enhancements to the sidelink communications, and in particular, to sidelink carrier aggregation and multi-component carrier (CC) grants. In device-to-device (D2D) communication systems operating according to a New Radio (NR) scheme, a first UE may be in communication with both a network entity and a second UE. In such D2D communication systems, carrier aggregation may be implemented on a sidelink between the first UE and the second UE. According to one or more examples, each aggregated carrier may correspond to a CC. Further, each CC may be of a certain bandwidth and may not exceed a maximum number of aggregated carriers. Carrier aggregation provides increased benefits in high data rate applications in D2D communication systems by enabling increased bandwidth and be used for out-of-network coverage sidelink UEs. However, carrier aggregation may also result in an increased complexity.

As such, the present disclosure enhances sidelink carrier aggregation for high data-rate applications such as for Network Controlled Interactive Services (NCIS) or V2X that was otherwise limited in 5G NR. Specifically, present disclosure relates to enhancements to the set-up, activation, and deactivation of sidelink carrier aggregation. For example, when setting up sidelink carrier aggregation, the one or more UEs may be in coverage of a network entity (e.g., gNodeB) or out of coverage. The technical benefits of the one or more UEs being in coverage includes the ability to use the network entity (e.g., gNb) as a coordinator between the one or more UEs thereby requiring less overhead. The technical disadvantage of being in coverage includes the need to reduce any interference from the sidelink on the network entity. Further, an advantage of being out of coverage includes no need to reduce interference to the network entity. A disadvantage of being out of coverage includes increased overhead to set up control channel without network entity coordination.

In an aspect, when the one or more UEs are in coverage of the network entity, the network entity may configure multiple sidelink CCs for transmission and reception. An initial sidelink beam-pairing may occur on a designated sidelink CC. For example, the designated sidelink CC may correspond to at least one of a preconfigured sidelink CC, a CC on which one of the UEs transmits sidelink synchronization signal blocks (SSBs), or a CC on which one of the UEs successfully receives sidelink SSBs. Additional CCs may be added based on the network entity already knowing the capabilities of the UEs and configuring the additional CCs based on these capabilities (e.g., the number of CCs supported by each UE), or the UEs exchanging their capabilities directly via a sidelink radio resource control (RRC) and then transmitting the capabilities to the network entity for their preferred multi-CC configuration. Accordingly, the network entity may configure any additional sidelink CCs to the one or more UEs.

In an aspect, when the one or more UEs are out of coverage of the network entity, the one or more UEs perform a sidelink exchange (e.g., sidelink RRC) instead of via the network entity. Once exchanged, the one or more UEs configure any additional sidelink CCs. In some implementations, a first UE may configure additional sidelink CCs to multiple other UEs if the first UE is the hub UE in a star topology with multiple other UEs in periphery.

In an aspect, when the one or more UEs are in a mixed operation, a first UE may be in coverage with the network entity on a Uu CC and be able to set up a sidelink CC. Subsequently, the first UE may pair with a second UE via the sidelink and enable further sidelink CCs on which there may be no Uu operations. The in-coverage Uu CC may be used to set up these additional sidelink CCs in some instances (e.g., if the network entity of one of the CCs does not support sidelink carrier aggregation). Accordingly, these additional sidelink CCs may be added in a similar manner as those of the out of coverage operations as described herein.

In an aspect, a sidelink CC may be activated or deactivated. For example, activation and/or deactivation may be configured using Uu media access control (MAC) control element (CE), downlink control information (DCI), and sidelink MAC-CE/sidelink control information (SCI). The CC-index may be explicit or implicit based on the CC in which the activation and/or deactivation command was received.

In an aspect, the present disclosure provides apparatus and methods for performing an initial beam scanning procedure with a second UE in a designated sidelink component carrier, wherein the first UE and the second UE are configured in coverage with a network entity; receiving a configuration message from the network entity indicating one or more additional sidelink component carriers for the first UE and the second UE; and communicating with the second UE via a sidelink corresponding to at least one of the one or more additional sidelink component carriers and the designated sidelink component carrier based on the configuration message.

In an aspect, the present disclosure provides apparatus and methods at a network entity for determining one or more additional sidelink component carriers for sidelink communication between a first UE and a second UE, wherein the first UE and the second UE are configured in coverage with the network entity; and transmitting a configuration message to at least one of the first UE or the second UE, the configuration message indicating the additional sidelink component carriers and being configured to enable the sidelink communication between the first UE and the second UE based on one of the additional sidelink component carriers.

In an aspect, the present disclosure provides apparatus and methods at a first UE for performing an initial beam scanning procedure with a second UE in a designated sidelink component carrier, wherein the first UE and the second UE are configured out of coverage with a network entity; and communicating with the second UE via a sidelink corresponding to the designated sidelink component carrier.

In an aspect, the present disclosure provides apparatus and methods at a first UE for performing an initial beam scanning procedure with a second UE in a designated sidelink component carrier, wherein the first UE is configured in coverage with a network entity; determining additional sidelink component carriers for the first UE and the second UE, the second UE being out of coverage with the network entity; and communicating with the second UE via a sidelink corresponding to at least one of the additional sidelink component carriers and the designated sidelink component carrier.

In an aspect, the present disclosure provides apparatus and methods for receiving an indication to at least one of activate or deactivate multiple sidelink component carriers; determining one or more sidelink component carriers to at least one of activate or deactivate based on the indication; and performing the at least one of activation or deactivation on the one or more sidelink component carriers.

In an aspect, the present disclosure provides apparatus and methods for transmitting or receiving a reference signal to or from a second UE on a designated sidelink component carrier as part of an initial beam scanning procedure; receiving a configuration message from a network entity indicating one or more additional sidelink component carriers for the first UE and the second UE; and communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In an aspect, the present disclosure provides apparatus and methods for receiving a first capability message from a first UE and a second capability message from the second UE, wherein each of the first capability message and the second capability message respectively indicate one or more communication capabilities of the first UE and the second UE; and transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In an aspect, the present disclosure provides apparatus and methods for receiving one or more capabilities of a second UE for sidelink communication, wherein the first UE and the second UE are out of coverage of a network entity; transmitting, to the second UE, information about one or more additional sidelink component carriers; and communicating with the second UE via a sidelink corresponding to the designated sidelink component carrier and the one or more additional sidelink component carriers.

In an aspect, the present disclosure provides apparatus and methods for transmitting a reference signal to a second UE on a designated sidelink component carrier as part of an initial beam scanning procedure; determining one or more additional sidelink component carriers for the first UE and the second UE; and communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In an aspect, the present disclosure provides apparatus and methods for receiving an indication to at least one of activate or deactivate multiple sidelink component carriers; and activating one or more sidelink component carriers in response to the indication indicating activation.

In an aspect, the present disclosure provides apparatus and methods for transmitting, to a first UE, one or more capabilities of the second UE for sidelink communication, wherein the first UE and the second UE are out of coverage of a network entity; receiving, from the first UE, information about one or more additional sidelink component carriers; and communicating with the second UE via a sidelink corresponding to the designated sidelink component carrier and all of the one or more additional sidelink component carriers.

In an aspect, the present disclosure provides apparatus and methods for transmitting an indication to at least one of activate or deactivate multiple sidelink component carriers; and activating one or more sidelink component carriers in response to the indication indicating activation.

These and other features of the present disclosure are discussed in detail below with regard to FIGS. 1-19.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a UE 104b may include a communication component 121 for assisting with sidelink communications between a base station 102a and a UE 104a. The UE 104a may have a first access link 120a directly with the base station 102a, and a second communication link with the base station 102a via a sidelink 158a with the UE 104b, which has a second access link 120b to the base station 102a. The communication component 121 of the UE 104b may include a sidelink component 123, which may be selectively configured to set-up, activation, and deactivation of sidelink carrier aggregation.

Correspondingly, the UE 104a may be configured to manage communications with both the UE 104b via the sidelink 158a and the base station 102a via the access link 120a.

In an aspect, UE 104b, which may be referred to as first UE 104b, may configure communication component 121 and/or sidelink component 123 to transmit or receive a reference signal 122 to or from a second UE 104a on a designated sidelink component carrier 124 as part of an initial beam scanning procedure 125. UE 104b may configure communication component 121 and/or sidelink component 123 to receive a configuration message 126 from a network entity, base station 102a, indicating one or more additional sidelink component carriers 128 for the first UE 104b and the second UE 104a. UE 104b may configure communication component 121 and/or sidelink component 123 to communicate with the second UE 104a via a sidelink corresponding to at least one of the one or more additional sidelink component carriers 128 or the designated sidelink component carrier 124 based on the configuration message 126 on a sidelink beam pairing 130 performed in the designated sidelink component carrier, wherein the first UE 104b and the second UE 104a are configured in coverage with the network entity 102a.

In an aspect, UE 104b may configure communication component 121 and/or sidelink component 123 to transmit or receive a sidelink synchronization signal block (SSB) 131 to or from the second UE 104a on the designated sidelink component carrier 124, and establish a sidelink beam pairing 130 on the designated sidelink component carrier 124 with the second UE 104a based on the sidelink SSB 131. For example, the one or more additional sidelink component carriers 128 for the first UE 104b and the second UE 104a is configured based on one or more communication capabilities 133 for each of the first UE 104b and the second UE 104a.

In an aspect, UE 104b may configure communication component 121 and/or sidelink component 123 to transmit a capability message 135 to the network entity 102a, the capability message 135 indicating one or more communication capabilities 133 of the first UE 104b; and wherein receiving the configuration message 126 from the network entity 102a further comprises receiving the configuration message 126 in response to transmitting the capability message 135. For example, the capability message 135 includes multi-component carrier configurations 136 supported by the first UE 104b based on performing the initial beam scanning procedure 125 with the second UE 104a. In another example, the capability message 135 corresponds to a Uu radio resource configuration (RRC) message, wherein the one or more communication capabilities 133 correspond to a number of component carriers supported by the first UE 104b.

In an aspect, UE 104b may configure communication component 121 and/or sidelink component 123 to receive one or more capabilities of a second UE 104a for sidelink communication, wherein the first UE 104b and the second UE 104a are out of coverage of a network entity, i.e., base station 102a; transmit, to the second UE 104a, information about one or more additional sidelink component carriers 128; and communicate with the second UE 104a via a sidelink corresponding to the designated sidelink component carrier 124 and the one or more additional sidelink component carriers 128.

In an aspect, UE 104b may configure communication component 121 and/or sidelink component 123 to transmit or receiving a sidelink SSB 131 to the second UE 104a on the designated sidelink component carrier 124; and establish a sidelink beam pairing 130 on the designated sidelink component carrier 124 between the first UE 104b and the second UE 104a based on the sidelink SSB 131.

In an aspect, UE 104b may configure communication component 121 and/or sidelink component 123 to determine one or more additional sidelink component carriers 128 for the first UE 104b and the second UE 104a; and wherein communicating with the second UE 104a via the sidelink corresponding to the designated sidelink component carrier 124 further comprises communicating information of the one or more additional sidelink component carriers 128 with the second UE 104a via one or more sidelink component carriers corresponding to at least one of the designated sidelink component carrier 124 or the one or more additional sidelink component carriers 128.

In an aspect, UE 104b may configure communication component 121 and/or sidelink component 123 to transmit a reference signal 122 to a second UE 104a on a designated sidelink component carrier 124 as part of an initial beam scanning procedure 125; determine one or more additional sidelink component carriers 128 for the first UE 104b and the second UE 104a; and communicate with the second UE 104a via a sidelink corresponding to at least one of the one or more additional sidelink component carriers 128 or the designated sidelink component carrier 124 based on a configuration message 126 on a sidelink beam pairing 130 based on the designated signal, wherein the first UE 104b is in coverage of a network entity, i.e., base station 102a and the second UE 104a being out of coverage of the network entity 102a.

In an aspect, UE 104b may configure communication component 121 and/or sidelink component 123 to receive a sidelink SSB 131 from the second UE 104a on the designated sidelink component carrier 124; and establish a sidelink beam pairing 130 on the designated sidelink component carrier 124 with the second UE 104a based on the sidelink SSB 131.

In an aspect, UE 104b may configure communication component 121 and/or sidelink component 123 to receive an indication to at least one of activate or deactivate multiple sidelink component carriers 140; and activate one or more sidelink component carriers in response to the indication indicating activation.

In an aspect, UE 104b may configure communication component 121 and/or sidelink component 123 to deactivate one or more sidelink component carriers 140 in response to the indication indicating deactivation.

In an aspect, the indication corresponds to at least one of a media access control (MAC) control element (CE), a downlink control information (DCI), or a sidelink control information (SCI).

In an aspect, receiving the indication to at least one of activate or deactivate the multiple sidelink component carriers further comprises receiving the at least one of the MACE CE or the DCI on a downlink channel from a network entity 102a.

In an aspect, receiving the indication to at least one of activate or deactivate the multiple sidelink component carriers further comprises receiving the at least one of the MACE CE or the SCI on a sidelink component carrier from a second UE 104a.

In an aspect, the at least one of the MAC CE, the DCI or the SCI include a payload for indicating one or more sidelink component carriers to be at least one of activated or deactivated.

In an aspect, the at least one of the MAC CE, the DCI or the SCI implicitly indicate one or more sidelink component carriers to be at least one of activated or deactivated.

In an aspect, performing the at least one of activation or deactivation on the one or more sidelink component carriers further comprises performing activation on the one or more sidelink component carriers, wherein activation enables sidelink communications with a second UE 104a on the one or more sidelink component carriers.

In an aspect, performing the at least one of activation or deactivation on the one or more sidelink component carriers further comprises performing deactivation on the one or more sidelink component carriers, wherein deactivation disables sidelink communications with a second UE 104a on the one or more sidelink component carriers.

In an aspect, UE 104a may configure communication component 121 and/or sidelink component 123 to transmit, to a first UE 104b, one or more capabilities of the second UE 104a for sidelink communication, wherein the first UE 104b and the second UE 104a are out of coverage of a network entity 102a; receive, from the first UE 104b, information about one or more additional sidelink component carriers 128; and communicate with the second UE 104a via a sidelink corresponding to the designated sidelink component carrier 124 and all of the one or more additional sidelink component carriers 128.

In an aspect, UE 104a may configure communication component 121 and/or sidelink component 123 to transmit or receive a sidelink SSB 131 to the first UE 104b on the designated sidelink component carrier 124; and establish a sidelink beam pairing 130 on the designated sidelink component carrier 124 with the first UE 104b based on the sidelink SSB 131.

In an aspect, UE 104a may configure communication component 121 and/or sidelink component 123 to determine one or more additional sidelink component carriers 128 for the first UE 104b and the second UE 104a; and wherein communicating with the second UE 104a via the sidelink corresponding to the designated sidelink component carrier 124 further comprises communicating information of the one or more additional sidelink component carriers 128 with the first UE 104b via one or more sidelink component carriers corresponding to at least one of the designated sidelink component carrier 124 or the one or more additional sidelink component carriers 128.

In an aspect, UE 104b may configure communication component 121 and/or sidelink component 123 to transmit an indication to at least one of activate or deactivate multiple sidelink component carriers; and activate one or more sidelink component carriers in response to the indication indicating activation.

In an aspect, UE 104b may configure communication component 121 and/or sidelink component 123 to deactivate one or more sidelink component carriers in response to the indication indicating deactivation.

In an aspect, the indication corresponds to at least one of a MAC CE, a DCI, or a SCI.

In an aspect, receiving the indication to at least one of activate or deactivate the multiple sidelink component carriers further comprises receiving the at least one of the MACE CE or the DCI on a downlink channel from a network entity 102a.

Similarly, the base station 102a may include a base communication component 127 configured to manage communications with both the UE 104b via the access link 120b and the UE 104a via the access link 120a.

In an aspect, base station 102a may configure base station communication component 127 and/or base station sidelink component 137 to receive a first capability message 138 from a first UE 104b and a second capability message 139 from the second UE 104a, wherein each of the first capability message 138 and the second capability message 139 respectively indicate one or more communication capabilities 133 of the first UE 104b and the second UE 104a; and transmit a configuration message 126 to at least one of the first UE 104b or the second UE 104a, the configuration message 126 indicating the one or more additional sidelink component carriers 128 and enabling the sidelink communication between the first UE 104b and the second UE 104a based on one of the one or more additional sidelink component carriers 128, wherein the first UE 104b and the second UE 104a are in coverage with the network entity, i.e., base station 102a.

In an aspect, the one or more additional sidelink component carriers 128 for the sidelink communication between the first UE 104b and the second UE 104a are based on a number of component carriers supported by each of the first UE 104b and the second UE 104a.

In an aspect, each of the first capability message 138 and the second capability message 139 includes a preferred multi-component carrier configuration 136 based on an initial beam scanning procedure 125 between the first UE 104b and the second UE 104a.

In an aspect, each of the first capability message 138 and the second capability message 139 corresponds to a respective Uu RRC message.

In an aspect, the one or more communication capabilities 133 corresponds to a number of component carriers supported by the first UE 104b.

Further details of these operations performed by the UE 104a, the UE 104b, and the base station 102a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including UE 104b and UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as UE 104b and UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2

(24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
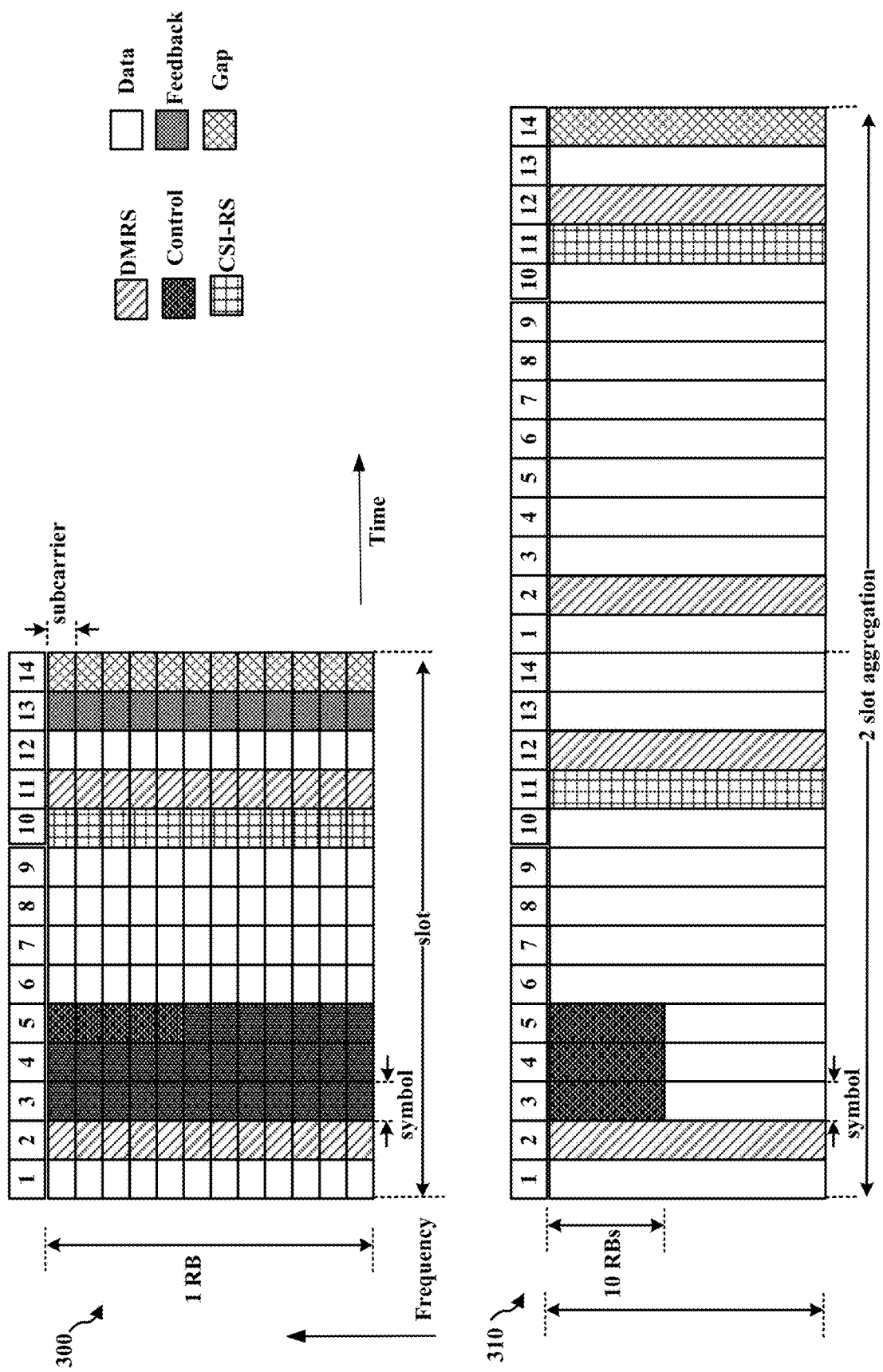
FIG. 3 illustrates example aspects of a sidelink slot structure, for sidelink communications between two of the communicating nodes in the system of FIG. 1 in accordance with one or more aspects of the present disclosure.

FIG. 3 illustrates example diagrams 300 and 310 illustrating examples slot structures that may be used for wireless communication between UE 104b and UE 104a, e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 3 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 3, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
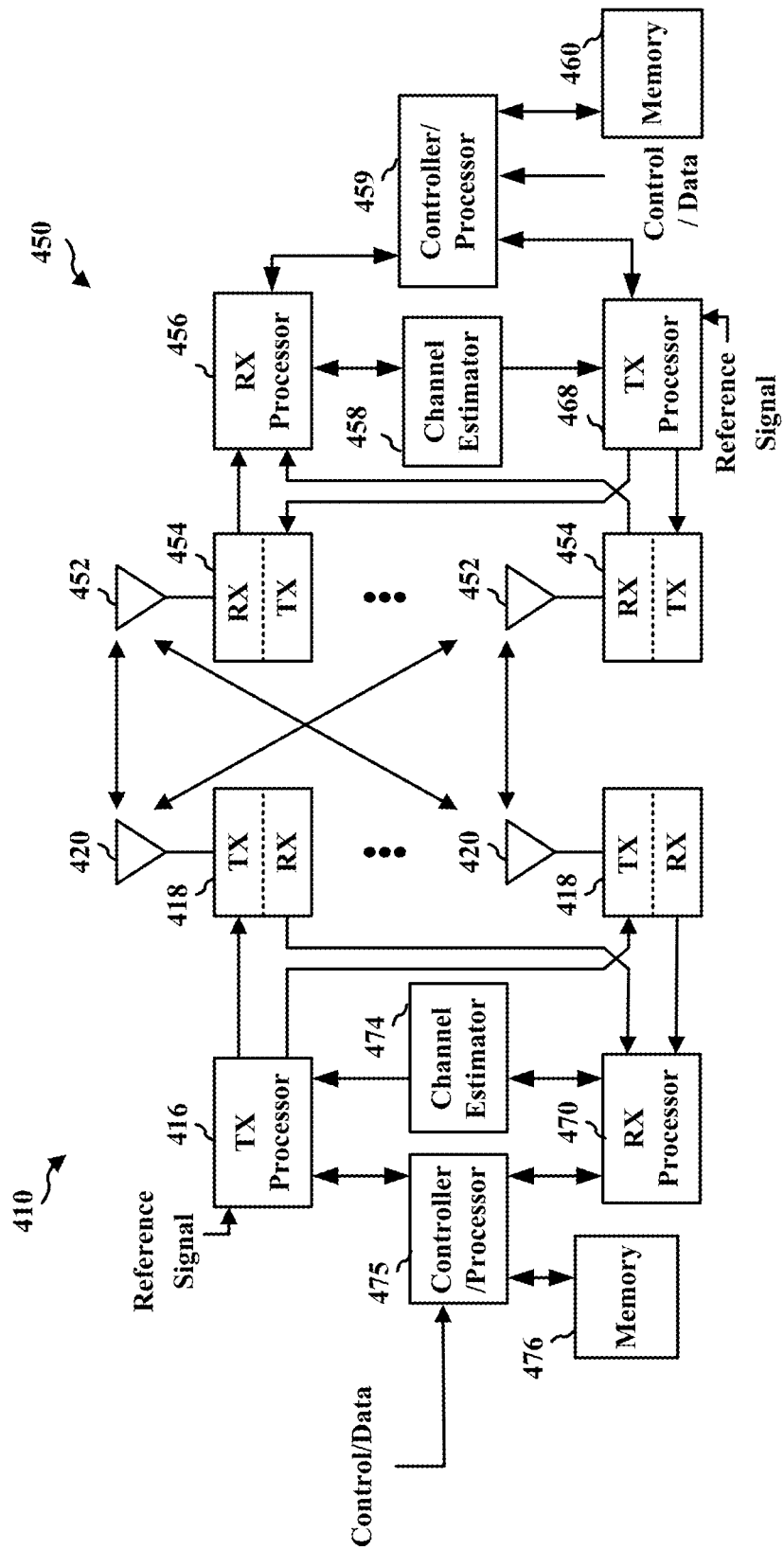
FIG. 4 is a schematic diagram of an example of hardware components of two of the communicating nodes in the system of FIG. 1 in accordance with one or more aspects of the present disclosure.

FIG. 4 is a diagram of hardware components of an example transmitting and/or receiving (TX/RX) nodes 410 and 450, which may be any combinations of base station 102—UE 104 communications, and/or UE 104—UE 104 communications in system 100. For example, such communications may including, but are not limited to, communications such as a base station transmitting to a UE, a UE transmitting to a second UE, a second UE transmitting to a UE, or a UE transmitting to a base station in an access network. In one specific example, the TX/RX node 410 may be an example implementation of base station 102 and where TX/RX node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the TX/RX node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the TX/RX node 450. If multiple spatial streams are destined for the TX/RX node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 410. These soft decisions may be based on channel estimates computed by the channel estimator 458. The soft decisions are then decoded and deinterleaved to recover the data and control signals that were originally transmitted by the TX/RX node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the TX/RX node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the TX/RX node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the TX/RX node 410 in a manner similar to that described in connection with the receiver function at the TX/RX node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, and/or 127 of FIG. 1.

In an implementation, at least one of the TX processor 416, the RX processor 470, and the controller/processor 475 may be configured to perform aspects in connection with components 121, and/or 127 of FIG. 1.

Figure 5:
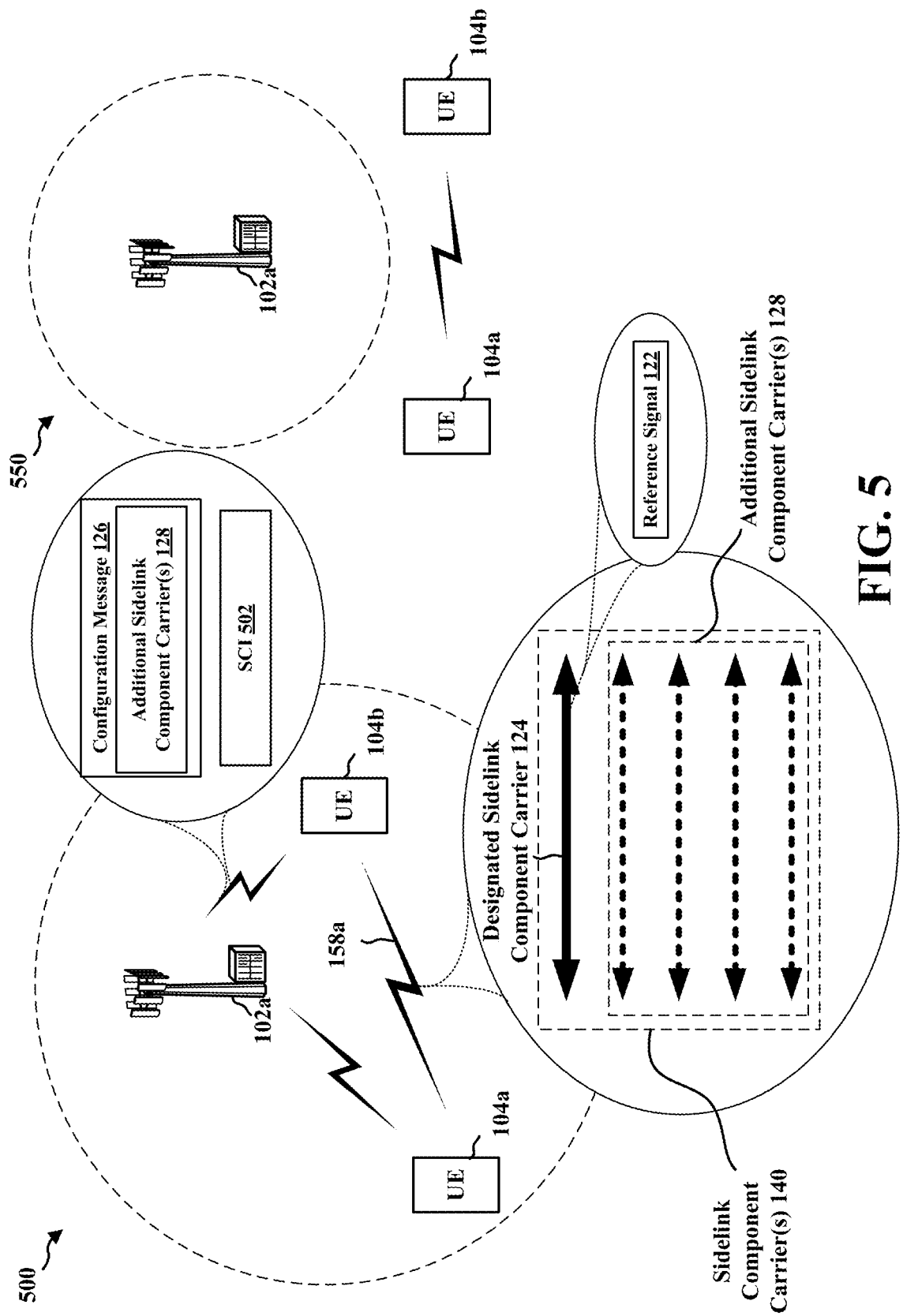
FIG. 5 is a schematic diagram of an example of a sidelink communication configuration operable in the system of FIG. 1 in accordance with one or more aspects of the present disclosure.

Referring to FIG. 5, the present aspects generally relate to a sidelink communication scenarios 500 and 550 that includes communicating over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application. In an example, the sidelink communication scenarios may be a sidelink relay communication.

In the sidelink communication scenario 500, a UE 104*a* may establish a Uu communication with one or more base stations 102 and at least one link via a sidelink with a UE 104*b*. In a first case, when the one or more UEs 104*a* and 104*b* are in coverage of the network entity 102*a*, the network entity 102*a* may configure one or more sidelink CCs for transmission and reception. An initial sidelink beam-pairing may occur on a designated sidelink CC between UE 104*a* and 104*b*. For example, the designated sidelink CC may correspond to at least one of a preconfigured sidelink CC, a CC on which one of the UEs (e.g., UE 104*a*) transmits sidelink SSBs, or a CC on which one of the UEs (e.g., UE 104*b*) successfully receives sidelink SSBs. Additional CCs may be added based on the network entity already knowing the capabilities of the UEs 104*a* and 104*b* and configuring the additional CCs based on these capabilities (e.g., the number of CCs supported by each UE 104*a* and 104*b*), or the UEs 104*a* and 104*b* exchanging their capabilities directly via a sidelink RRC message and then transmitting the capabilities to the network entity 102*a* for their preferred multi-CC configuration. Accordingly, the network entity 102*a* may configure additional sidelink CCs to the one or more UEs.

In an aspect for scenario 500, UE 104*b* may receive a reference signal 122 from a second UE 104*a* on a designated sidelink component carrier 124 as part of an initial beam scanning procedure 125. Further, UE 104*b* may receive a configuration message 126 from a base station 102*a* indicating one or more additional sidelink component carriers 128 for the first UE 104*b* and the second UE 104*a*. UE 104*b* may communicate with the second UE 104*a* via a sidelink 158*a* corresponding to at least one of the one or more additional sidelink component carriers 128 or the designated sidelink component carrier 124 based on the configuration message 126 on a sidelink beam pairing 130 performed in the designated sidelink component carrier 124.

In an aspect, UE 104*b* may receive an indication corresponding to SCI 502 from base station 102*a*. For example, SCI 502 may include a payload for indicating one or more sidelink component carriers 140 to be at least one of activated or deactivated. In another example, SCI 502 may implicitly indicate one or more sidelink component carriers 140 to be at least one of activated or deactivated.

In an aspect for scenario 550, when the one or more UEs 104*a* and 104*b* are out of coverage of the network entity 102*a*, the one or more UEs 104*a* and 104*b* perform a sidelink exchange (e.g., sidelink RRC message) instead of via the network entity 102*a*. Once exchanged, the one or more UEs 104*a* and 104*b* may configure any additional sidelink CCs. In some implementations, the first UE 104*a* may configure any additional sidelink CCs for another UE 104*b* 104*a*104*b* if the first UE 104*a* is engaged in a star topology like behavior similar to a network entity.

Figure 6:
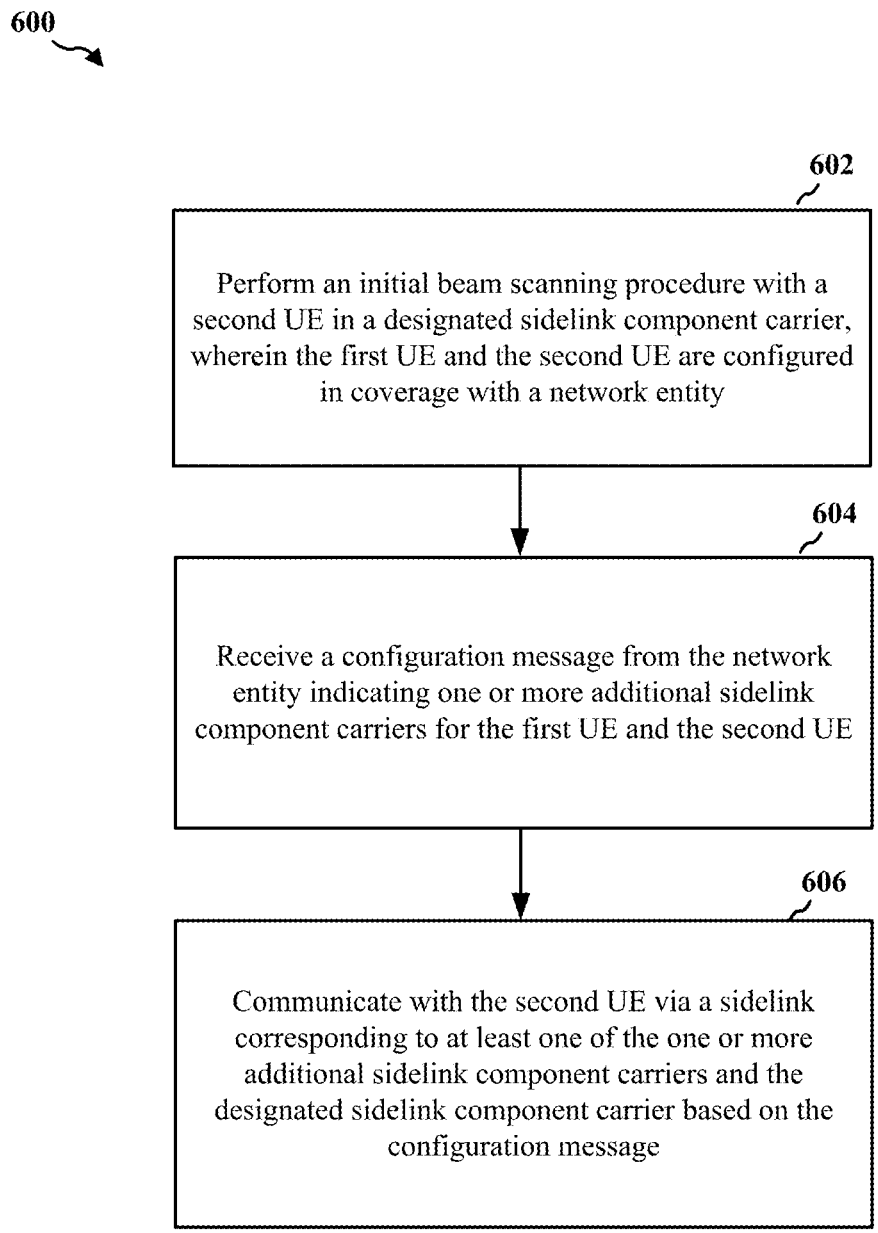
FIG. 6 is a flowchart of an example method of wireless communication of a first UE operable in the system of FIG. 1 in accordance with one or more aspects of the present disclosure.
Figure 18:
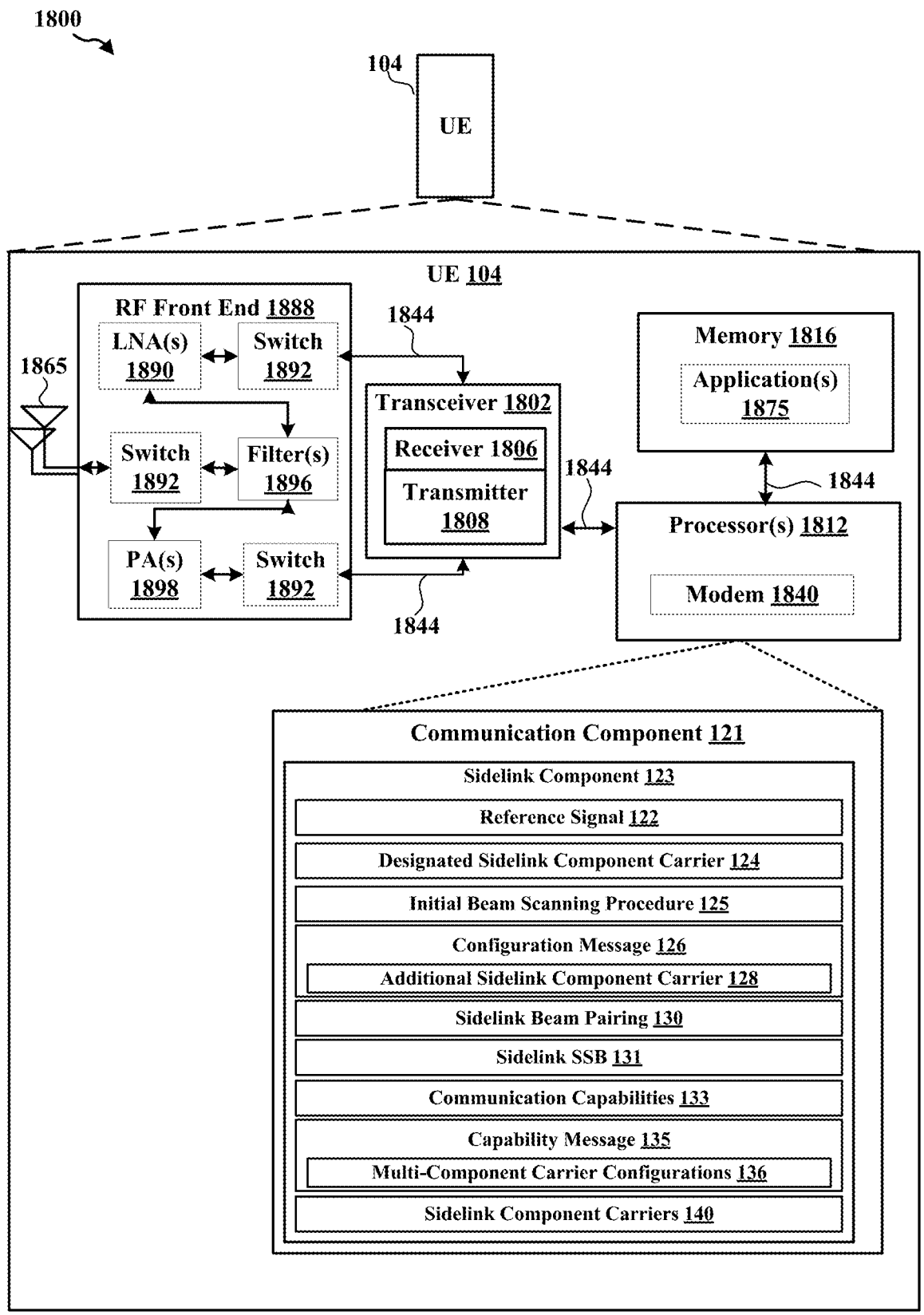
FIG. 18 is a block diagram of an example UE, in accordance with various aspects of the present disclosure.

Referring to FIG. 6, an example method 600 of wireless communication may be performed by the UE 104*b*, which may include one or more components as discussed in FIG. 1, 4, or 18, and which may perform set-up, activation, and deactivation of sidelink carrier aggregation as discussed above with regard to FIGS. 1-4.

At 602, method 600 includes performing an initial beam scanning procedure with a second UE in a designated sidelink component carrier, wherein the first UE and the second UE are configured in coverage with a network entity. For example, in an aspect, the UE 104*b* may operate one or any combination of antennas 1865, RF front end 1888, transceiver 1802, processor 1812, memory 1816, modem 1840, or communication component 121 in combination with the sidelink component 123 to perform an initial beam scanning procedure with a second UE 104a in a designated sidelink component carrier, wherein the first UE 104b and the second UE 104a are configured in coverage with a network entity 102. Thus, the UE 104b, antennas 1865, RF front end 1888, transceiver 1802, processor 1812, memory 1816, modem 1840, and communication component 121 may define the means for performing an initial beam scanning procedure with a second UE in a designated sidelink component carrier, wherein the first UE and the second UE are configured in coverage with a network entity.

At 604, method 600 includes receiving a configuration message from the network entity indicating one or more additional sidelink component carriers for the first UE and the second UE. For example, in an aspect, the UE 104b may operate one or any combination of antennas 1865, RF front end 1888, transceiver 1802, processor 1812, memory 1816, modem 1840, or communication component 121 in combination with the sidelink component 123 to receive a configuration message from the network entity 102 indicating one or more additional sidelink component carriers for the first UE 104b and the second UE 104a. Thus, the UE 104b, antennas 1865, RF front end 1888, transceiver 1802, processor 1812, memory 1816, modem 1840, and communication component 121 may define the means for receiving a configuration message from the network entity indicating one or more additional sidelink component carriers for the first UE and the second UE.

At 606, method 600 includes communicating with the second UE via a sidelink corresponding to at least one of the one or more additional sidelink component carriers and the designated sidelink component carrier based on the configuration message. For example, in an aspect, the UE 104b may operate one or any combination of antennas 1865, RF front end 1888, transceiver 1802, processor 1812, memory 1816, modem 1840, or communication component 121 in combination with the sidelink component 123 to communicate with the second UE 104a via a sidelink corresponding to at least one of the one or more additional sidelink component carriers and the designated sidelink component carrier based on the configuration message. Thus, the UE 104b, antennas 1865, RF front end 1888, transceiver 1802, processor 1812, memory 1816, modem 1840, and communication component 121 may define the means for communicating with the second UE via a sidelink corresponding to at least one of the one or more additional sidelink component carriers and the designated sidelink component carrier based on the configuration message.

In some implementations of method 600, the communicating component 121, such as in conjunction with sidelink component 123, transceiver 1802, processor 1812, memory 1816, or modem 1840, configured to perform the initial beam scanning procedure with the second UE 104a may be further configured for transmitting a sidelink synchronization signal block (SSB) to the second UE 104a on the designated sidelink component carrier; and establishing a sidelink beam pairing on the designated sidelink component carrier with the second UE 104a based on the sidelink SSB.

In some implementations of method 600, the initial beam scanning procedure includes transmission of one or more capabilities of the first UE 104b for sidelink communication.

In some implementations of method 600, the communicating component 121, such as in conjunction with sidelink component 123, transceiver 1802, processor 1812, memory 1816, or modem 1840, configured to perform the initial beam scanning procedure with the second UE 104a may be further configured for receiving a sidelink SSB from the second UE 104a on the designated sidelink component carrier; and establishing a sidelink beam pairing on the designated sidelink component carrier with the second UE 104a based on the sidelink SSB.

In some implementations of method 600, the initial beam scanning procedure includes transmission of one or more capabilities of the second UE 104a for sidelink communication.

In some implementations of method 600, the one or more additional sidelink component carriers for the first UE 104b and the second UE 104a is configured based on one or more communication capabilities for each of the first UE 104b and the second UE 104a.

In some implementations of method 600, the communicating component 121, such as in conjunction with sidelink component 123, transceiver 1802, processor 1812, memory 1816, or modem 1840, is configured to transmit a capability message to the network entity 102, the capability message indicating one or more communication capabilities of the first UE 104b; and wherein receiving the configuration message from the network entity 102 further comprises receiving the configuration message in response to transmitting the capability message.

In some implementations of method 600, the capability message includes multi-component carrier configurations supported by the first UE 104b based on performing the initial beam scanning procedure with the second UE 104a.

In some implementations of method 600, the capability message corresponds to a Uu radio resource configuration (RRC).

In some implementations of method 600, the one or more communication capabilities corresponds to a number of component carriers supported by the first UE 104b.

Figure 7:
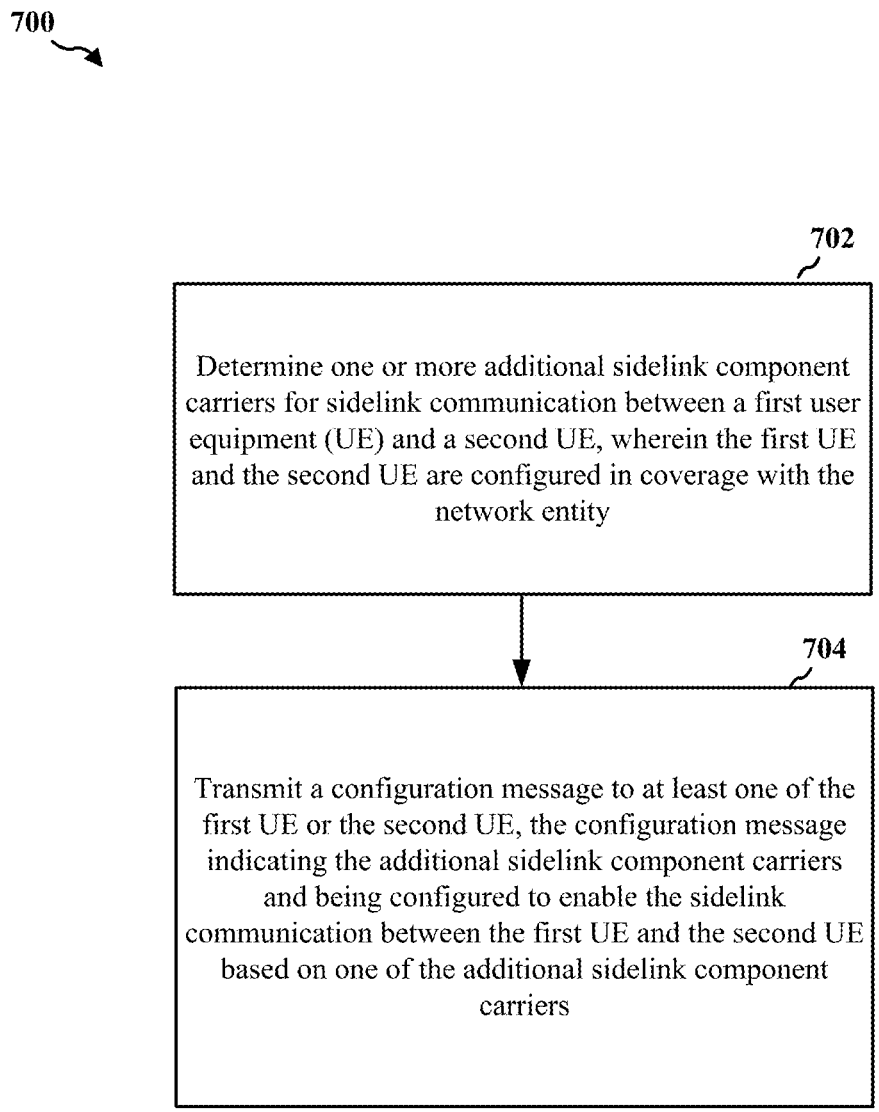
FIG. 7 is a flowchart of another example method of wireless communication of a network entity operable in the system of FIG. 1 in accordance with one or more aspects of the present disclosure.
Figure 19:
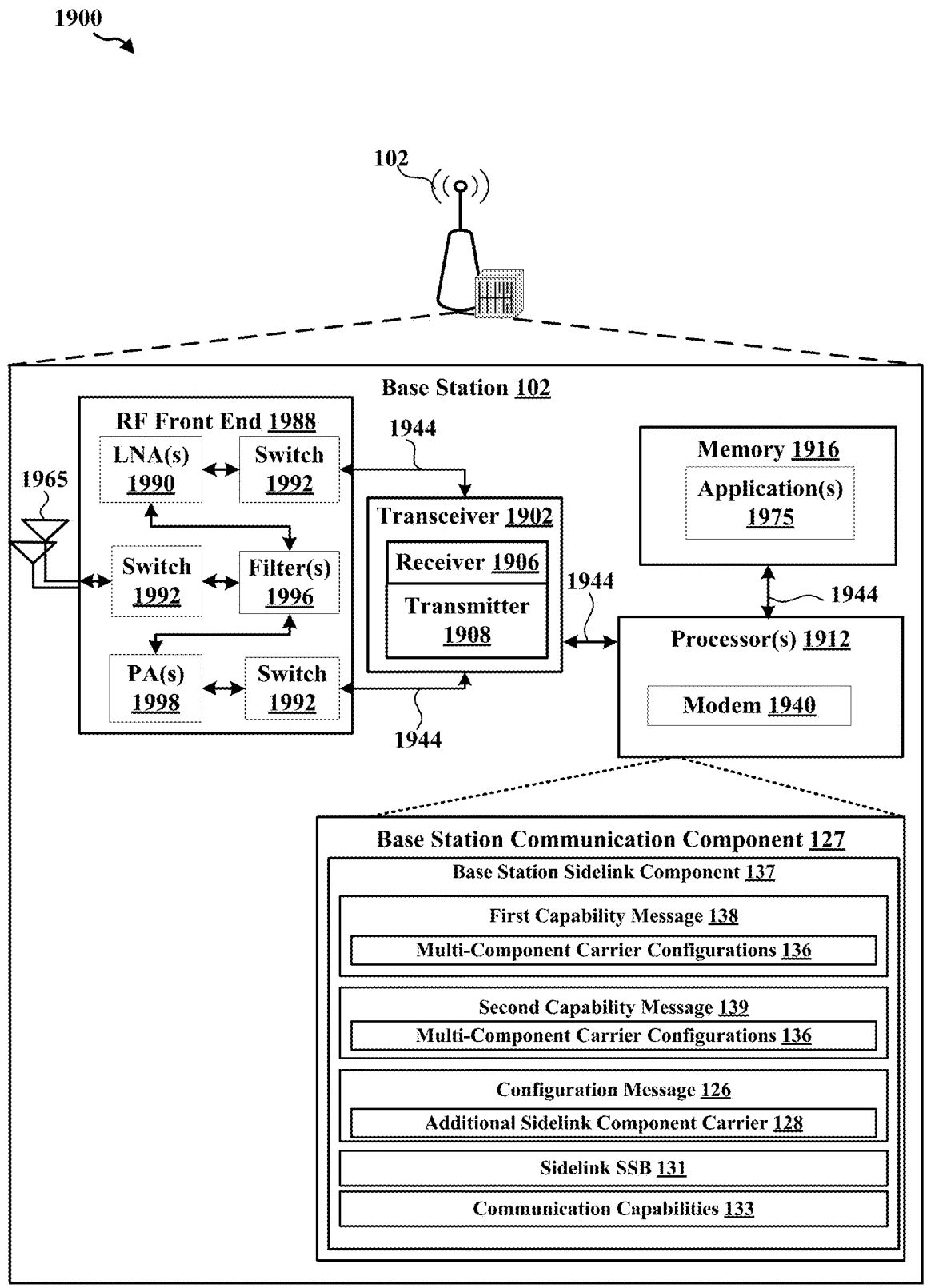
FIG. 19 is a block diagram of an example base station, in accordance with various aspects of the present disclosure.

Referring to FIG. 7, an example method 700 of wireless communication may be performed by the network entity 102, which may include one or more components as discussed in FIG. 1, 4, or 19, and which may perform set-up, activation, and deactivation of sidelink carrier aggregation as discussed above with regard to FIGS. 1-4.

At 702, method 700 includes determining one or more additional sidelink component carriers for sidelink communication between a first UE and a second UE, wherein the first UE and the second UE are configured in coverage with the network entity. For example, in an aspect, the network entity 102 may operate one or any combination of antennas 1965, RF front end 1988, transceiver 1902, processor 1912, memory 1916, modem 1940, or base station communication component 127 to determine one or more additional sidelink component carriers for sidelink communication between a first UE 104b and a second UE 104a, wherein the first UE 104b and the second UE 104a are configured in coverage with the network entity 102. Thus, the network entity 102, antennas 1965, RF front end 1988, transceiver 1902, processor 1912, memory 1916, modem 1940, and base station communication component 127 may define the means for determining one or more additional sidelink component carriers for sidelink communication between a first UE and a second UE, wherein the first UE and the second UE are configured in coverage with the network entity.

At 704, method 700 includes transmitting a configuration message to at least one of the first UE or the second UE, the configuration message indicating the one or more additional sidelink component carriers and being configured to enable the sidelink communication between the first UE and the second UE based on one of the one or more additional sidelink component carriers. For example, in an aspect, the network entity 102 may operate one or any combination of antennas 1965, RF front end 1988, transceiver 1902, processor 1912, memory 1916, modem 1940, or base station communication component 127 to transmit a configuration message to at least one of the first UE 104*b* or the second UE 104*a*, the configuration message indicating the one or more additional sidelink component carriers and being configured to enable the sidelink communication between the first UE 104*b* and the second UE 104*a* based on one of the one or more additional sidelink component carriers. Thus, the network entity 102, antennas 1965, RF front end 1988, transceiver 1902, processor 1912, memory 1916, modem 1940, and base station communication component 127 may define the means for transmitting a configuration message to at least one of the first UE or the second UE, the configuration message indicating the one or more additional sidelink component carriers and being configured to enable the sidelink communication between the first UE and the second UE based on one of the one or more additional sidelink component carriers.

In some implementations of method 700, the communicating component 127, such as in conjunction with transceiver 1902, processor 1912, memory 1916, or modem 1940, configured to determine the one or more additional sidelink component carriers for the sidelink communication between the first UE and the second UE is further configured to determine the one or more additional sidelink component carriers for the sidelink communication between the first UE and the second UE based on a number of component carriers supported by each of the first UE and the second UE.

In some implementations of method 700, the communicating component 127, such as in conjunction with transceiver 1902, processor 1912, memory 1916, or modem 1940, is configured to receiving a first capability message from the first UE 104*b* and a second capability message from the second UE 104*a*, wherein each of the first capability message and the second capability message respectively indicate one or more communication capabilities of the first UE 104*b* and the second UE 104*a*.

In some implementations of method 700, each of the first capability message and the second capability message includes a preferred multi-component carrier configuration based on an initial beam scanning procedure between the first UE 104*b* and the second UE 104*a*.

In some implementations of method 700, each of the first capability message and the second capability message corresponds to a Uu RRC.

In some implementations of method 700, the one or more communication capabilities corresponds to a number of component carriers supported by the first UE 104*b*.

Figure 8:
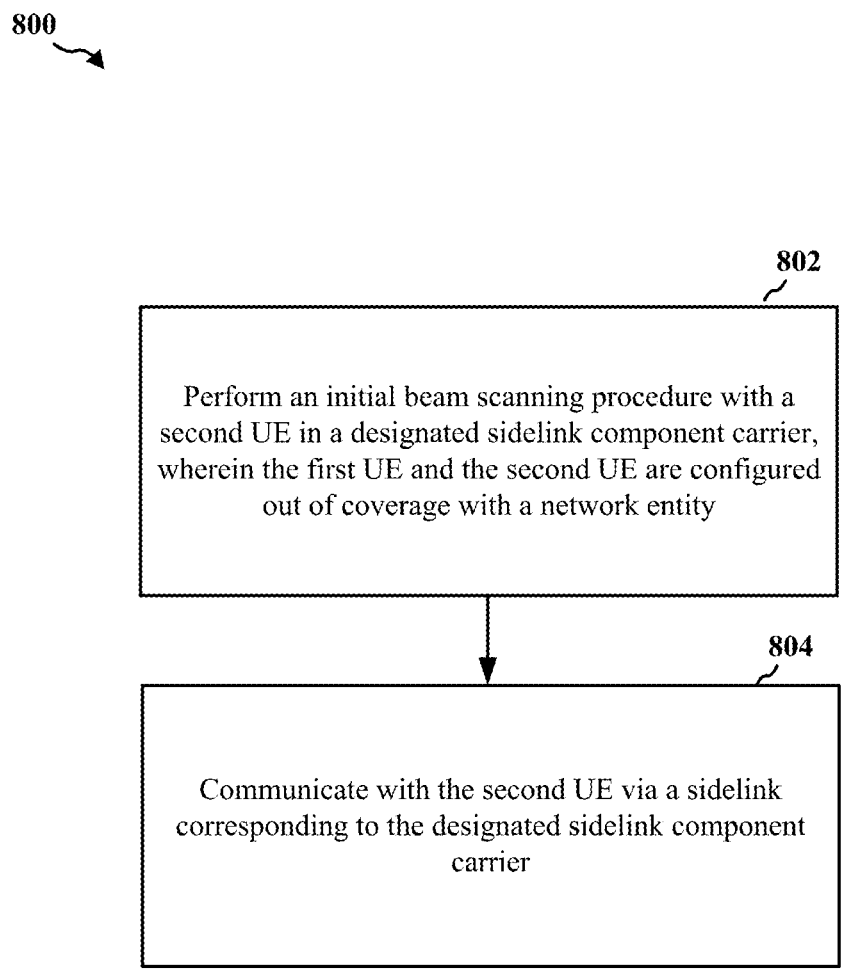
FIG. 8 is a flowchart of another example method of wireless communication of a first UE operable in the system of FIG. 1 in accordance with one or more aspects of the present disclosure.

Referring to FIG. 8, an example method 800 of wireless communication may be performed by the UE 104*b*, which may include one or more components as discussed in FIG. 1, 4, or 18, and which may perform set-up, activation, and deactivation of sidelink carrier aggregation as discussed above with regard to FIGS. 1-4.

At 802, method 800 includes performing an initial beam scanning procedure with a second UE in a designated sidelink component carrier, wherein the first UE and the second UE are configured out of coverage with a network entity. For example, in an aspect, the UE 104*b* may operate one or any combination of antennas 1865, RF front end 1888, transceiver 1802, processor 1812, memory 1816, modem 1840, or communication component 121 in combination with the sidelink component 123 to perform an initial beam scanning procedure with a second UE 104*a* in a designated sidelink component carrier, wherein the first UE 104*b* and the second UE 104*a* are configured out of coverage with a network entity 102. Thus, the UE 104*b*, antennas 1865, RF front end 1888, transceiver 1802, processor 1812, memory 1816, modem 1840, and communication component 121 may define the means for performing an initial beam scanning procedure with a second UE in a designated sidelink component carrier, wherein the first UE and the second UE are configured out of coverage with a network entity.

At 804, method 800 includes communicating with the second UE via a sidelink corresponding to the designated sidelink component carrier. For example, in an aspect, the UE 104*b* may operate one or any combination of antennas 1865, RF front end 1888, transceiver 1802, processor 1812, memory 1816, modem 1840, or communication component 121 in combination with the sidelink component 123 to communicate with the second UE 104*a* via a sidelink corresponding to the designated sidelink component carrier. Thus, the UE 104*b*, antennas 1865, RF front end 1888, transceiver 1802, processor 1812, memory 1816, modem 1840, and communication component 121 may define the means for communicating with the second UE via a sidelink corresponding to the designated sidelink component carrier.

In some implementations of method 800, the communicating component 121, such as in conjunction with sidelink component 123, transceiver 1802, processor 1812, memory 1816, or modem 1840, configured to perform the initial beam scanning procedure with the second UE 104*a* further comprises transmitting a sidelink SSB to the second UE 104*a* on the designated sidelink component carrier; and establishing a sidelink beam pairing on the designated sidelink component carrier between the first UE 104*b* and the second UE 104*a* based on the sidelink SSB.

In some implementations of method 800, the initial beam scanning procedure includes transmission of one or more capabilities of the first UE 104*b* for sidelink communication.

In some implementations of method 800, the communicating component 121, such as in conjunction with sidelink component 123, transceiver 1802, processor 1812, memory 1816, or modem 1840, configured to perform the initial beam scanning procedure with the second UE further comprises receiving a sidelink SSB from the second UE 104*a* on the designated sidelink component carrier; and establishing a sidelink beam pairing on the designated sidelink component carrier between the first UE 104*b* and the second UE 104*a* based on the sidelink SSB.

In some implementations of method 800, the initial beam scanning procedure includes reception of one or more capabilities of the second UE 104*a* for sidelink communication.

In some implementations of method 800, the communicating component 121, such as in conjunction with sidelink component 123, transceiver 1802, processor 1812, memory 1816, or modem 1840, configured to determine one or more additional sidelink component carriers for the first UE 104*b* and the second UE 104*a*.

Figure 9:
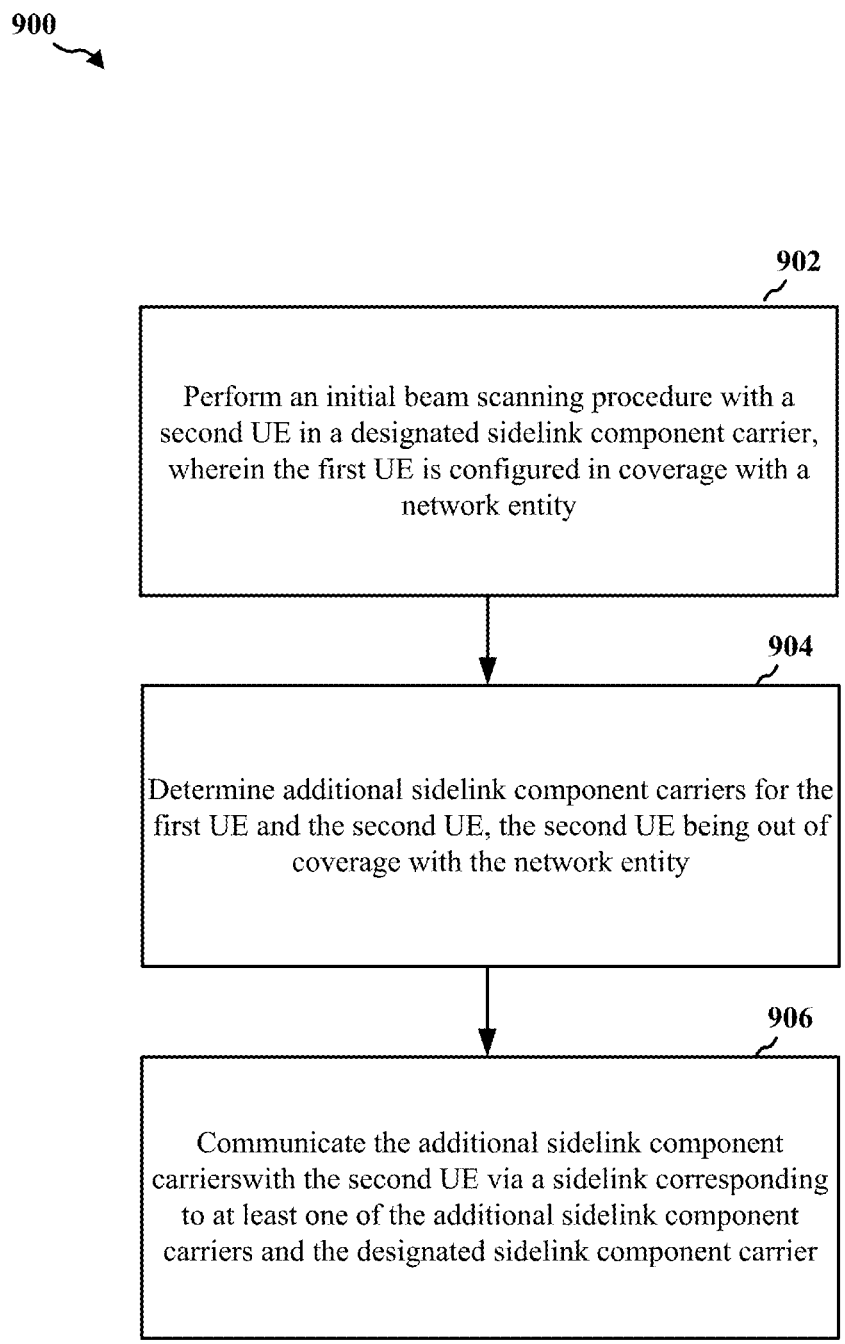
FIG. 9 is a flowchart of another example method of wireless communication of a first UE operable in the system of FIG. 1 in accordance with one or more aspects of the present disclosure.

Referring to FIG. 9, an example method 900 of wireless communication may be performed by the UE 104*b*, which may include one or more components as discussed in FIG. 1, 4, or 18, and which may perform set-up, activation, and deactivation of sidelink carrier aggregation as discussed above with regard to FIGS. 1-4.

At 902, method 900 includes performing an initial beam scanning procedure with a second UE in a designated sidelink component carrier, wherein the first UE is configured in coverage with a network entity. For example, in an aspect, the UE 104*b* may operate one or any combination of antennas 1865, RF front end 1888, transceiver 1802, processor 1812, memory 1816, modem 1840, or communication component 121 in combination with the sidelink component 123 to perform an initial beam scanning procedure with a second UE 104*a* in a designated sidelink component carrier, wherein the first UE 104*b* is configured in coverage with a network entity 102. Thus, the UE 104*b*, antennas 1865, RF front end 1888, transceiver 1802, processor 1812, memory 1816, modem 1840, and communication component 121 may define the means for performing an initial beam scanning procedure with a second UE in a designated sidelink component carrier, wherein the first UE is configured in coverage with a network entity.

At 904, method 900 includes determining one or more additional sidelink component carriers for the first UE and the second UE, the second UE being out of coverage with the network entity. For example, in an aspect, the UE 104*b* may operate one or any combination of antennas 1865, RF front end 1888, transceiver 1802, processor 1812, memory 1816, modem 1840, or communication component 121 in combination with the sidelink component 123 to determine one or more additional sidelink component carriers for the first UE 104*b* and the second UE 104*a*, the second UE 104*a* being out of coverage with the network entity 102. Thus, the UE 104*b*, antennas 1865, RF front end 1888, transceiver 1802, processor 1812, memory 1816, modem 1840, and communication component 121 may define the means for determining one or more additional sidelink component carriers for the first UE and the second UE, the second UE being out of coverage with the network entity.

At 906, method 900 includes communicating the one or more additional sidelink component carriers with the second UE via a sidelink corresponding to at least one of the one or more additional sidelink component carriers and the designated sidelink component carrier. For example, in an aspect, the UE 104*b* may operate one or any combination of antennas 1865, RF front end 1888, transceiver 1802, processor 1812, memory 1816, modem 1840, or communication component 121 in combination with the sidelink component 123 to communicate the one or more additional sidelink component carriers with the second UE 104*a* via a sidelink corresponding to at least one of the one or more additional sidelink component carriers and the designated sidelink component carrier. Thus, the UE 104*b*, antennas 1865, RF front end 1888, transceiver 1802, processor 1812, memory 1816, modem 1840, and communication component 121 may define the means for communicating the one or more additional sidelink component carriers with the second UE via a sidelink corresponding to at least one of the one or more additional sidelink component carriers and the designated sidelink component carrier.

In some implementations of method 900, the communicating component 121, such as in conjunction with sidelink component 123, transceiver 1802, processor 1812, memory 1816, or modem 1840, configured to perform the initial beam scanning procedure with the second UE 104*a* further comprises transmitting a sidelink SSB to the second UE 104*a* on the designated sidelink component carrier; and establishing a sidelink beam pairing on the designated sidelink component carrier between the first UE 104*b* and the second UE 104*a* based on the sidelink SSB.

In some implementations of method 900, the initial beam scanning procedure includes transmission of one or more capabilities of the first UE for sidelink communication.

In some implementations of method 900, the communicating component 121, such as in conjunction with sidelink component 123, transceiver 1802, processor 1812, memory 1816, or modem 1840, configured to perform the initial beam scanning procedure with the second UE 104*a* further comprises receiving a sidelink SSB from the second UE 104*a* on the designated sidelink component carrier; and establishing a sidelink beam pairing on the designated sidelink component carrier between the first UE 104*b* and the second UE 104*a* based on the sidelink SSB.

In some implementations of method 900, the initial beam scanning procedure includes reception of one or more capabilities of the second UE 104*a* for sidelink communication.

Figure 10:
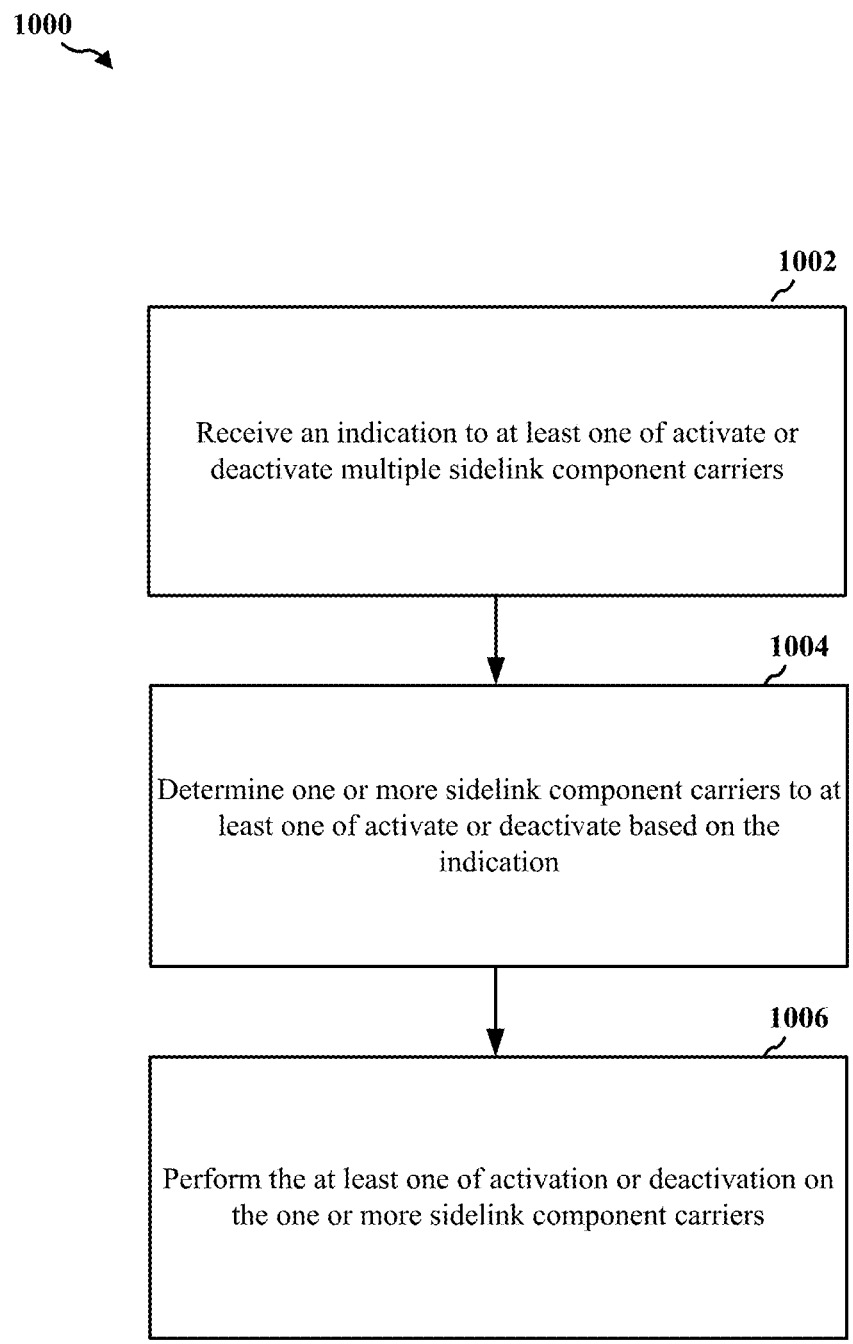
FIG. 10 is a flowchart of another example method of wireless communication of a UE operable in the system of FIG. 1 in accordance with one or more aspects of the present disclosure.

Referring to FIG. 10, an example method 1000 of wireless communication may be performed by the UE 104*b*, which may include one or more components as discussed in FIG. 1, 4, or 18, and which may perform set-up, activation, and deactivation of sidelink carrier aggregation as discussed above with regard to FIGS. 1-4.

At 1002, method 1000 includes receiving an indication to at least one of activate or deactivate multiple sidelink component carriers. For example, in an aspect, the UE 104*b* may operate one or any combination of antennas 1865, RF front end 1888, transceiver 1802, processor 1812, memory 1816, modem 1840, or communication component 121 in combination with the sidelink component 123 to receive an indication to at least one of activate or deactivate multiple sidelink component carriers. Thus, the UE 104*b*, antennas 1865, RF front end 1888, transceiver 1802, processor 1812, memory 1816, modem 1840, and communication component 121 may define the means for receiving an indication to at least one of activate or deactivate multiple sidelink component carriers.

At 1004, method 1000 includes determining one or more sidelink component carriers to at least one of activate or deactivate based on the indication. For example, in an aspect, the UE 104*b* may operate one or any combination of antennas 1865, RF front end 1888, transceiver 1802, processor 1812, memory 1816, modem 1840, or communication component 121 in combination with the sidelink component 123 to determine one or more sidelink component carriers to at least one of activate or deactivate based on the indication. Thus, the UE 104*b*, antennas 1865, RF front end 1888, transceiver 1802, processor 1812, memory 1816, modem 1840, and communication component 121 may define the means for determining one or more sidelink component carriers to at least one of activate or deactivate based on the indication.

At 1006, method 1000 includes performing the at least one of activation or deactivation on the one or more sidelink component carriers. For example, in an aspect, the UE 104*b* may operate one or any combination of antennas 1865, RF front end 1888, transceiver 1802, processor 1812, memory 1816, modem 1840, or communication component 121 in combination with the sidelink component 123 to perform the at least one of activation or deactivation on the one or more sidelink component carriers. Thus, the UE 104*b*, antennas 1865, RF front end 1888, transceiver 1802, processor 1812, memory 1816, modem 1840, and communication component 121 may define the means for performing the at least one of activation or deactivation on the one or more sidelink component carriers.

In some implementations of method 1000, the indication corresponds to at least one of a media access control (MAC) control element (CE), a downlink control information (DCI), or a sidelink control information (SCI).

In some implementations of method 1000, the communicating component 121, such as in conjunction with sidelink component 123, transceiver 1802, processor 1812, memory 1816, or modem 1840, configured to receive the indication to at least one of activate or deactivate the multiple sidelink component carriers further comprises receiving the at least one of the MACE CE or the DCI on a downlink channel from a network entity 102.

In some implementations of method 1000, the communicating component 121, such as in conjunction with sidelink component 123, transceiver 1802, processor 1812, memory 1816, or modem 1840, configured to receive the indication to at least one of activate or deactivate the multiple sidelink component carriers further comprises receiving the at least one of the MACE CE or the SCI on a sidelink component carrier from a second UE 104a.

In some implementations of method 1000, the at least one of the MAC CE, the DCI or the SCI include a payload for indicating one or more sidelink component carriers to be at least one of activated or deactivated.

In some implementations of method 1000, the at least one of the MAC CE, the DCI or the SCI implicitly indicate one or more sidelink component carriers to be at least one of activated or deactivated.

In some implementations of method 1000, the communicating component 121, such as in conjunction with sidelink component 123, transceiver 1802, processor 1812, memory 1816, or modem 1840, configured to perform the at least one of activation or deactivation on the one or more sidelink component carriers further comprises performing activation on the one or more sidelink component carriers, wherein activation enables sidelink communications between the first UE 104b and a second UE 104a on the one or more activated sidelink component carriers.

In some implementations of method 1000, the communicating component 121, such as in conjunction with sidelink component 123, transceiver 1802, processor 1812, memory 1816, or modem 1840, configured to perform the at least one of activation or deactivation on the one or more sidelink component carriers further comprises performing deactivation on the one or more sidelink component carriers, wherein deactivation disables sidelink communications between the first UE 104b and a second UE 104a on the one or more deactivated sidelink component carriers.

Figure 11:
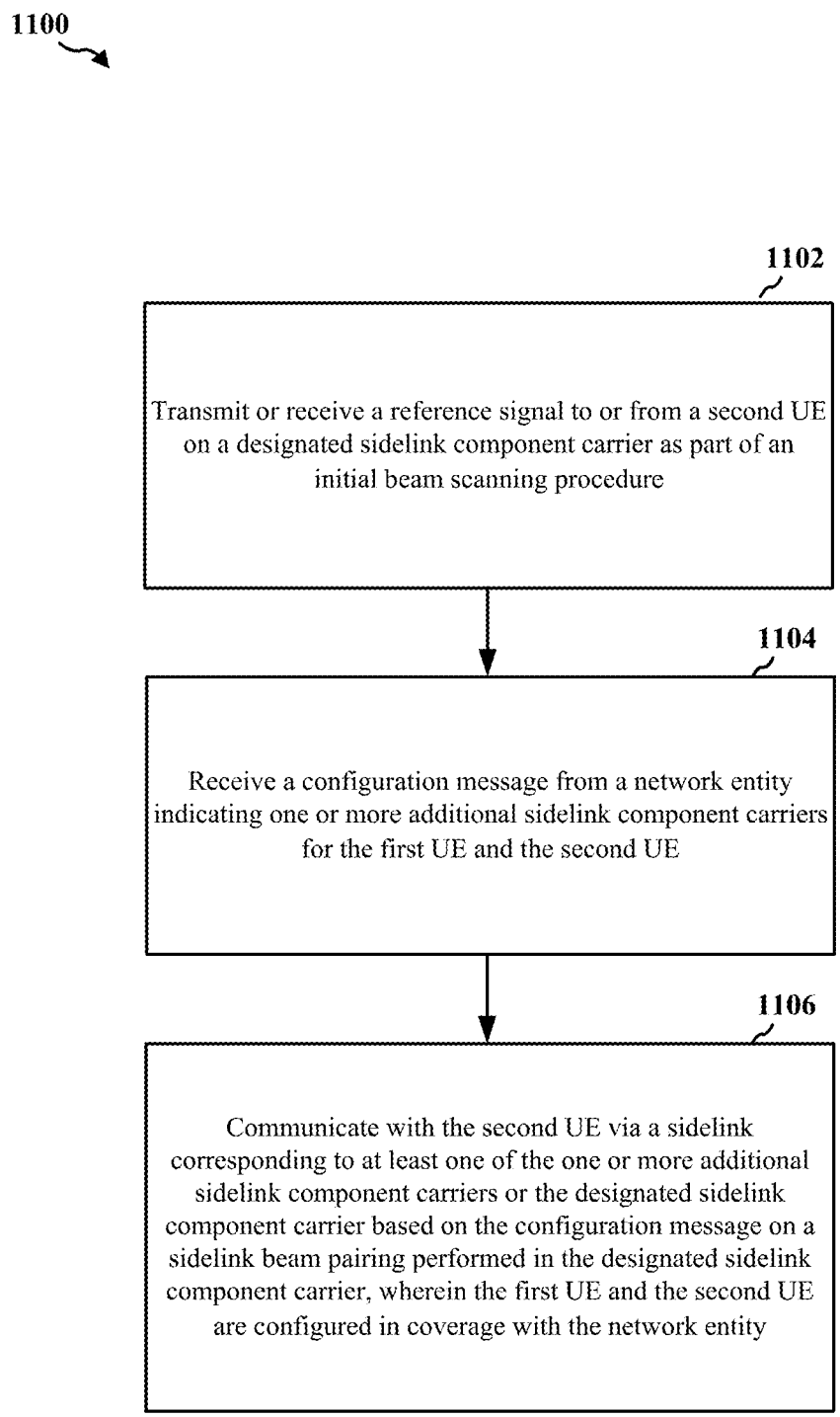
FIG. 11 is a flowchart of another example method of wireless communication of a first UE operable in the system of FIG. 1 in accordance with one or more aspects of the present disclosure.

Referring to FIG. 11, an example method 1100 of wireless communication may be performed by the UE 104b, which may include one or more components as discussed in FIG. 1, 4, or 18, and which may perform set-up, activation, and deactivation of sidelink carrier aggregation as discussed above with regard to FIGS. 1-4.

At 1102, method 1100 includes transmitting or receiving a reference signal to or from a second UE on a designated sidelink component carrier as part of an initial beam scanning procedure. For example, in an aspect, the UE 104b may operate one or any combination of antennas 1865, RF front end 1888, transceiver 1802, processor 1812, memory 1816, modem 1840, or communication component 121 in combination with the sidelink component 123 to transmit or receive a reference signal 122 to or from a second UE 104a on a designated sidelink component carrier 124 as part of an initial beam scanning procedure 125. Thus, the UE 104b, antennas 1865, RF front end 1888, transceiver 1802, processor 1812, memory 1816, modem 1840, and communication component 121 may define the means for transmitting or receiving a reference signal to or from a second UE on a designated sidelink component carrier as part of an initial beam scanning procedure.

At 1104, method 1100 includes receiving a configuration message from the network entity indicating one or more additional sidelink component carriers for the first UE and the second UE. For example, in an aspect, the UE 104b may operate one or any combination of antennas 1865, RF front end 1888, transceiver 1802, processor 1812, memory 1816, modem 1840, or communication component 121 in combination with the sidelink component 123 to receive a configuration message 126 from the network entity 102a indicating one or more additional sidelink component carriers 128 for the first UE 104b and the second UE 104a. Thus, the UE 104b, antennas 1865, RF front end 1888, transceiver 1802, processor 1812, memory 1816, modem 1840, and communication component 121 may define the means for receiving a configuration message from the network entity indicating one or more additional sidelink component carriers for the first UE and the second UE.

At 1106, method 1100 includes communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity. For example, in an aspect, the UE 104b may operate one or any combination of antennas 1865, RF front end 1888, transceiver 1802, processor 1812, memory 1816, modem 1840, or communication component 121 in combination with the sidelink component 123 to communicate with the second UE 104a via a sidelink corresponding to at least one of the one or more additional sidelink component carriers 128 or the designated sidelink component carrier 124 based on the configuration message 126 on a sidelink beam pairing 130 performed in the designated sidelink component carrier 124, wherein the first UE 104b and the second UE 104a are configured in coverage with the network entity 102a. Thus, the UE 104b, antennas 1865, RF front end 1888, transceiver 1802, processor 1812, memory 1816, modem 1840, and communication component 121 may define the means for communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

In an aspect of method 1100, UE 104b may configure communication component 121 and/or sidelink component 123 to transmit or receive a sidelink SSB 131 to or from the second UE 104a on the designated sidelink component carrier 124, and establish a sidelink beam pairing 130 on the designated sidelink component carrier 124 with the second UE 104a based on the sidelink SSB 131. For example, the one or more additional sidelink component carriers 128 for the first UE 104b and the second UE 104a are configured based on one or more communication capabilities 133 for each of the first UE 104b and the second UE 104a.

In an aspect of method 1100, UE 104b may configure communication component 121 and/or sidelink component 123 to transmit a capability message 135 to the network entity 102a, the capability message 135 indicating one or more communication capabilities 133 of the first UE 104b; and wherein receiving the configuration message 126 from the network entity 102a further comprises receiving the configuration message 126 in response to transmitting the capability message 135. For example, the capability message 135 includes multi-component carrier configurations 136 supported by the first UE 104b based on performing the initial beam scanning procedure 125 with the second UE 104a. In another example, the capability message 135 corresponds to a Uu RRC message, wherein the one or more communication capabilities 133 correspond to a number of component carriers supported by the first UE 104b.

Figure 12:
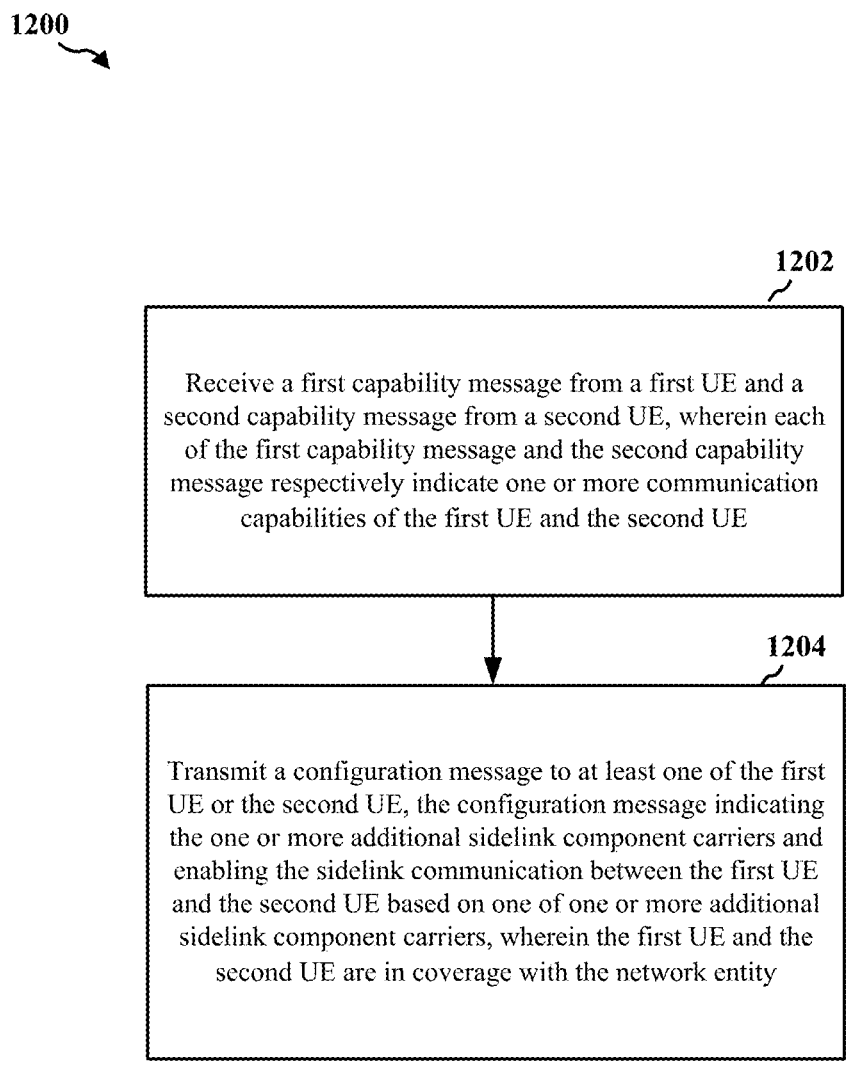
FIG. 12 is a flowchart of another example method of wireless communication of a network entity operable in the system of FIG. 1 in accordance with one or more aspects of the present disclosure.

Referring to FIG. 12, an example method 1200 of wireless communication may be performed by the network entity 102, which may include one or more components as discussed in FIG. 1, 4, or 19, and which may perform set-up, activation, and deactivation of sidelink carrier aggregation as discussed above with regard to FIGS. 1-4.

At 1202, method 1200 includes receiving a first capability message from a first UE and a second capability message from the second UE, wherein each of the first capability message and the second capability message respectively indicate one or more communication capabilities of the first UE and the second UE. For example, in an aspect, the network entity 102 may operate one or any combination of antennas 1965, RF front end 1988, transceiver 1902, processor 1912, memory 1916, modem 1940, or base station communication component 127 to receive a first capability message 138 from a first UE 104b and a second capability message 139 from the second UE 104a, wherein each of the first capability message 138 and the second capability message 139 respectively indicate one or more communication capabilities of the first UE 104b and the second UE 104a. Thus, the network entity 102, antennas 1965, RF front end 1988, transceiver 1902, processor 1912, memory 1916, modem 1940, and base station communication component 127 may define the means for receiving a first capability message from a first UE and a second capability message from the second UE, wherein each of the first capability message and the second capability message respectively indicate one or more communication capabilities of the first UE and the second UE.

At 1204, method 1200 includes transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity. For example, in an aspect, the network entity 102 may operate one or any combination of antennas 1965, RF front end 1988, transceiver 1902, processor 1912, memory 1916, modem 1940, or base station communication component 127 to transmit a configuration message 126 to at least one of the first UE 104b or the second UE 104a, the configuration message 126 indicating the one or more additional sidelink component carriers 128 and enabling the sidelink communication between the first UE 104b and the second UE 104a based on one of the one or more additional sidelink component carriers 128, wherein the first UE 104b and the second UE 104a are in coverage with the network entity 102a. Thus, the network entity 102, antennas 1965, RF front end 1988, transceiver 1902, processor 1912, memory 1916, modem 1940, and base station communication component 127 may define the means for transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

In an aspect of method 1200, the one or more additional sidelink component carriers 128 for the sidelink communication between the first UE 104b and the second UE 104a are based on a number of component carriers supported by each of the first UE 104b and the second UE 104a.

In an aspect of method 1200, each of the first capability message 138 and the second capability message 139 includes a preferred multi-component carrier configuration 136 based on an initial beam scanning procedure 125 between the first UE 104b and the second UE 104a.

In an aspect of method 1200, each of the first capability message 138 and the second capability message 139 corresponds to a respective Uu RRC.

Figure 13:
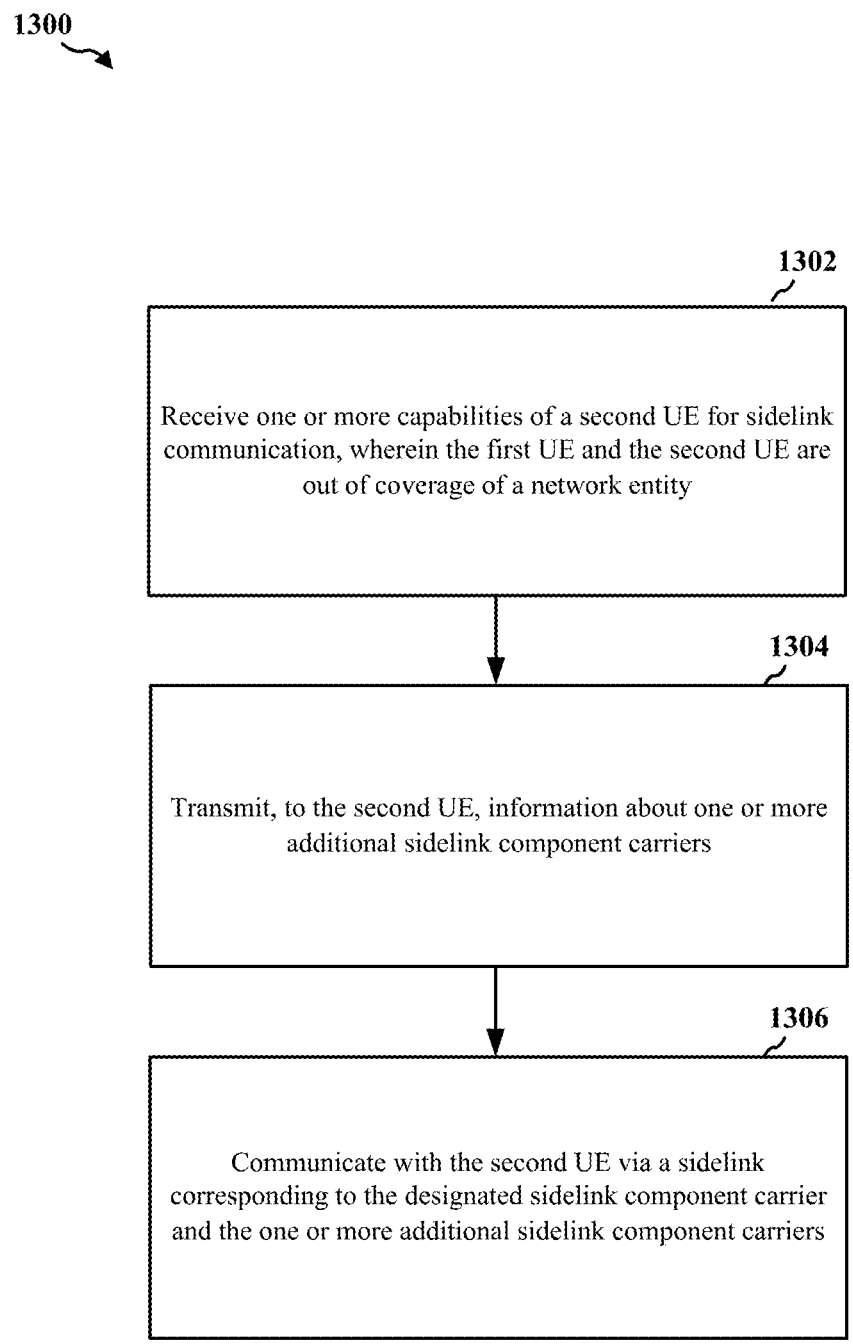
FIG. 13 is a flowchart of another example method of wireless communication of a first UE operable in the system of FIG. 1 in accordance with one or more aspects of the present disclosure.

In an aspect of method 1200, the one or more communication capabilities 133 corresponds to a number of component carriers supported by the first UE 104b. Referring to FIG. 13, an example method 1300 of wireless communication may be performed by the UE 104b, which may include one or more components as discussed in FIG. 1, 4, or 18, and which may perform set-up, activation, and deactivation of sidelink carrier aggregation as discussed above with regard to FIGS. 1-4.

At 1302, method 1300 includes receiving one or more capabilities of a second UE for sidelink communication, wherein the first UE and the second UE are out of coverage of a network entity. For example, in an aspect, the UE 104b may operate one or any combination of antennas 1865, RF front end 1888, transceiver 1802, processor 1812, memory 1816, modem 1840, or communication component 121 in combination with the sidelink component 123 to receive one or more capabilities of a second UE 104a for sidelink communication, wherein the first UE 104b and the second UE 104a are out of coverage of a network entity 102a. Thus, the UE 104b, antennas 1865, RF front end 1888, transceiver 1802, processor 1812, memory 1816, modem 1840, and communication component 121 may define the means for receiving one or more capabilities of a second UE for sidelink communication, wherein the first UE and the second UE are out of coverage of a network entity.

At 1304, method 1300 includes transmitting, to the second UE, information about one or more additional sidelink component carriers. For example, in an aspect, the UE 104b may operate one or any combination of antennas 1865, RF front end 1888, transceiver 1802, processor 1812, memory 1816, modem 1840, or communication component 121 in combination with the sidelink component 123 to transmit, to the second UE 104a, information about one or more additional sidelink component carriers 128. Thus, the UE 104b, antennas 1865, RF front end 1888, transceiver 1802, processor 1812, memory 1816, modem 1840, and communication component 121 may define the means for transmitting, to the second UE, information about one or more additional sidelink component carriers.

At 1306, method 1300 includes communicating with the second UE via a sidelink corresponding to the designated sidelink component carrier and the one or more additional sidelink component carriers. For example, in an aspect, the UE 104b may operate one or any combination of antennas 1865, RF front end 1888, transceiver 1802, processor 1812, memory 1816, modem 1840, or communication component 121 in combination with the sidelink component 123 to communicate with the second UE 104a via a sidelink corresponding to the designated sidelink component carrier 124 and the one or more additional sidelink component carriers 128. Thus, the UE 104b, antennas 1865, RF front end 1888, transceiver 1802, processor 1812, memory 1816, modem 1840, and communication component 121 may define the means for communicating with the second UE via a sidelink corresponding to the designated sidelink component carrier and the one or more additional sidelink component carriers.

In an aspect of method 1300, UE 104b may configure communication component 121 and/or sidelink component 123 to transmit or receiving a sidelink SSB 131 to or from the second UE 104a on the designated sidelink component carrier 124; and establish a sidelink beam pairing 130 on the designated sidelink component carrier 124 between the first UE 104b and the second UE 104a based on the sidelink SSB 131.

In an aspect of method 1300, UE 104b may configure communication component 121 and/or sidelink component 123 to determine one or more additional sidelink component carriers 128 for the first UE 104b and the second UE 104a.

Figure 14:
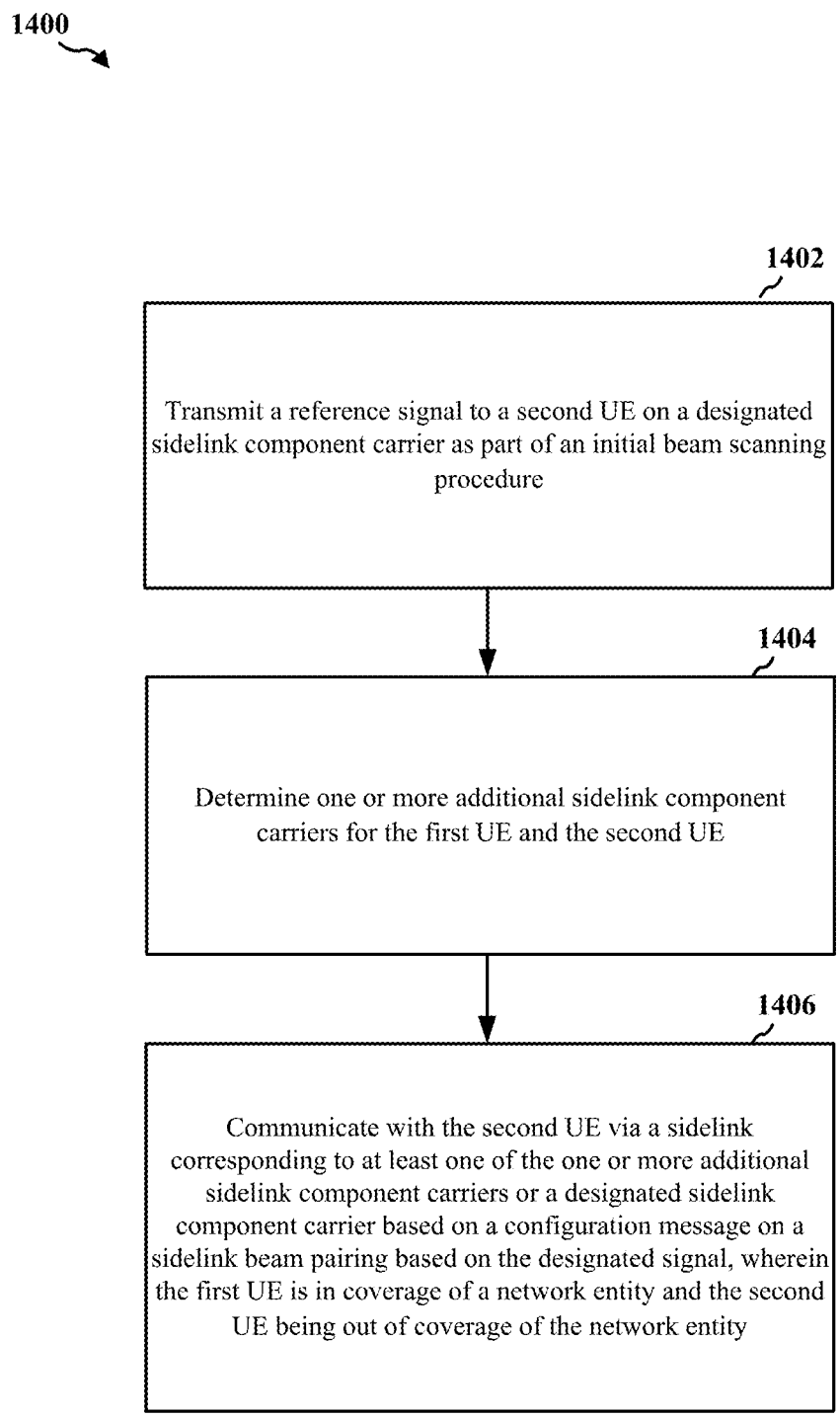
FIG. 14 is a flowchart of another example method of wireless communication of a first UE operable in the system of FIG. 1 in accordance with one or more aspects of the present disclosure.

Referring to FIG. 14, an example method 1400 of wireless communication may be performed by the UE 104b, which may include one or more components as discussed in FIG. 1, 4, or 18, and which may perform set-up, activation, and deactivation of sidelink carrier aggregation as discussed above with regard to FIGS. 1-4.

At 1402, method 1400 includes transmitting a reference signal to a second UE on a designated sidelink component carrier as part of an initial beam scanning procedure. For example, in an aspect, the UE 104b may operate one or any combination of antennas 1865, RF front end 1888, transceiver 1802, processor 1812, memory 1816, modem 1840, or communication component 121 in combination with the sidelink component 123 to transmit a reference signal 122 to a second UE 104a on a designated sidelink component carrier 124 as part of an initial beam scanning procedure 125. Thus, the UE 104b, antennas 1865, RF front end 1888, transceiver 1802, processor 1812, memory 1816, modem 1840, and communication component 121 may define the means for transmitting a reference signal to a second UE on a designated sidelink component carrier as part of an initial beam scanning procedure.

At 1404, method 1400 includes determining one or more additional sidelink component carriers for the first UE and the second UE. For example, in an aspect, the UE 104b may operate one or any combination of antennas 1865, RF front end 1888, transceiver 1802, processor 1812, memory 1816, modem 1840, or communication component 121 in combination with the sidelink component 123 to determine one or more additional sidelink component carriers 128 for the first UE 104b and the second UE 104a. Thus, the UE 104b, antennas 1865, RF front end 1888, transceiver 1802, processor 1812, memory 1816, modem 1840, and communication component 121 may define the means for determining one or more additional sidelink component carriers for the first UE and the second UE.

At 1406, method 1400 includes communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity. For example, in an aspect, the UE 104b may operate one or any combination of antennas 1865, RF front end 1888, transceiver 1802, processor 1812, memory 1816, modem 1840, or communication component 121 in combination with the sidelink component 123 to communicate with the second UE 104a via a sidelink corresponding to at least one of the one or more additional sidelink component carriers 128 or the designated sidelink component carrier 124 based on a configuration message 126 on a sidelink beam pairing 130 based on the designated signal, wherein the first UE 104b is in coverage of a network entity 102a and the second UE 104a being out of coverage of the network entity 102a. Thus, the UE 104b, antennas 1865, RF front end 1888, transceiver 1802, processor 1812, memory 1816, modem 1840, and communication component 121 may define the means for communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

In an aspect of method 1400, UE 104b may configure communication component 121 and/or sidelink component 123 to receive a sidelink SSB 131 from the second UE 104a on the designated sidelink component carrier 124; and establish a sidelink beam pairing 130 on the designated sidelink component carrier 124 with the second UE 104a based on the sidelink SSB 131.

Figure 15:
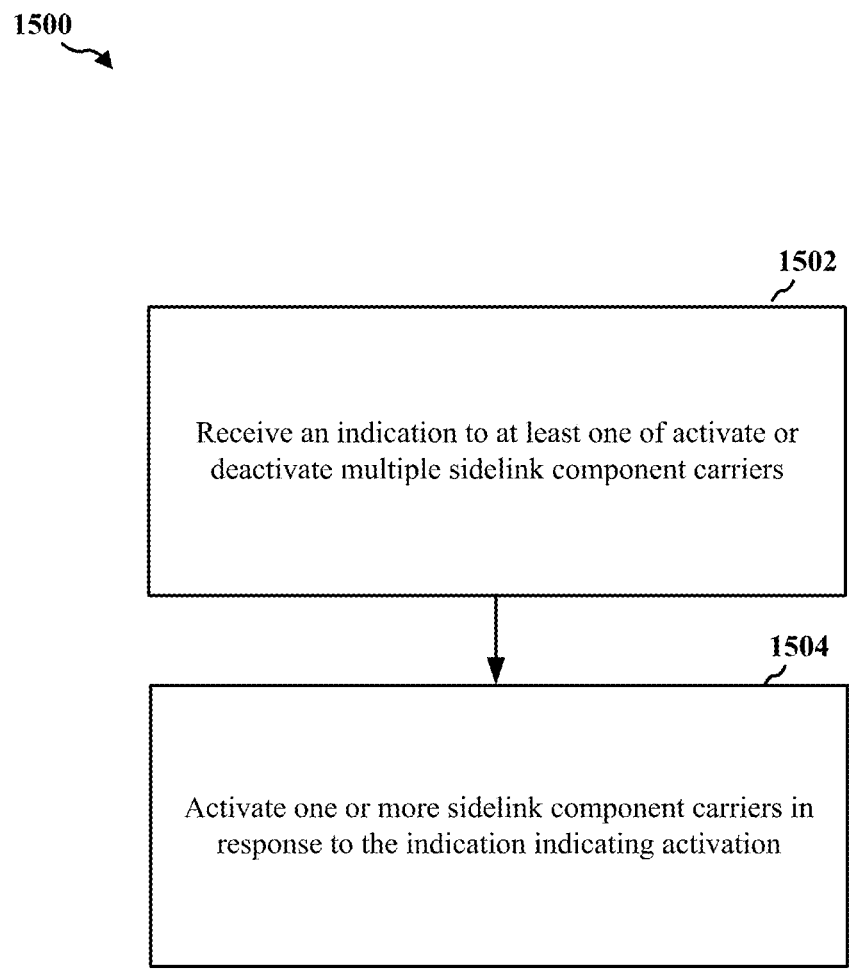
FIG. 15 is a flowchart of another example method of wireless communication of a first UE operable in the system of FIG. 1 in accordance with one or more aspects of the present disclosure.

Referring to FIG. 15, an example method 1500 of wireless communication may be performed by the UE 104b, which may include one or more components as discussed in FIG. 1, 4, or 18, and which may perform set-up, activation, and deactivation of sidelink carrier aggregation as discussed above with regard to FIGS. 1-4.

At 1102a, method 1500 includes receiving an indication to at least one of activate or deactivate multiple sidelink component carriers. For example, in an aspect, the UE 104b may operate one or any combination of antennas 1865, RF front end 1888, transceiver 1802, processor 1812, memory 1816, modem 1840, or communication component 121 in combination with the sidelink component 123 to receive an indication to at least one of activate or deactivate multiple sidelink component carriers. Thus, the UE 104b, antennas 1865, RF front end 1888, transceiver 1802, processor 1812, memory 1816, modem 1840, and communication component 121 may define the means for receiving an indication to at least one of activate or deactivate multiple sidelink component carriers.

At 1504, method 1500 includes activating one or more sidelink component carriers in response to the indication indicating activation. For example, in an aspect, the UE 104b may operate one or any combination of antennas 1865, RF front end 1888, transceiver 1802, processor 1812, memory 1816, modem 1840, or communication component 121 in combination with the sidelink component 123 to activate one or more sidelink component carriers in response to the indication indicating activation. Thus, the UE 104b, antennas 1865, RF front end 1888, transceiver 1802, processor 1812, memory 1816, modem 1840, and communication component 121 may define the means for activating one or more sidelink component carriers in response to the indication indicating activation.

In an aspect of method 1500, UE 104b may configure communication component 121 and/or sidelink component 123 to deactivate one or more sidelink component carriers in response to the indication indicating deactivation.

In an aspect of method 1500, the indication corresponds to at least one of a MAC CE, a DCI, or a SCI.

In an aspect of method 1500, receiving the indication to at least one of activate or deactivate the multiple sidelink component carriers further comprises receiving the at least one of the MACE CE or the DCI on a downlink channel from a network entity 102a.

In an aspect of method 1500, receiving the indication to at least one of activate or deactivate the multiple sidelink component carriers further comprises receiving the at least one of the MACE CE or the SCI on a sidelink component carrier from a second UE 104a.

In an aspect of method 1500, the at least one of the MAC CE, the DCI or the SCI include a payload for indicating one or more sidelink component carriers to be at least one of activated or deactivated.

In an aspect of method 1500, the at least one of the MAC CE, the DCI or the SCI implicitly indicate one or more sidelink component carriers to be at least one of activated or deactivated.

In an aspect of method 1500, performing the at least one of activation or deactivation on the one or more sidelink component carriers further comprises performing activation on the one or more sidelink component carriers, wherein activation enables sidelink communications with a second UE 104a on the one or more sidelink component carriers.

In an aspect of method 1500, performing the at least one of activation or deactivation on the one or more sidelink component carriers further comprises performing deactivation on the one or more sidelink component carriers, wherein deactivation disables sidelink communications with a second UE 104a on the one or more sidelink component carriers.

Figure 16:
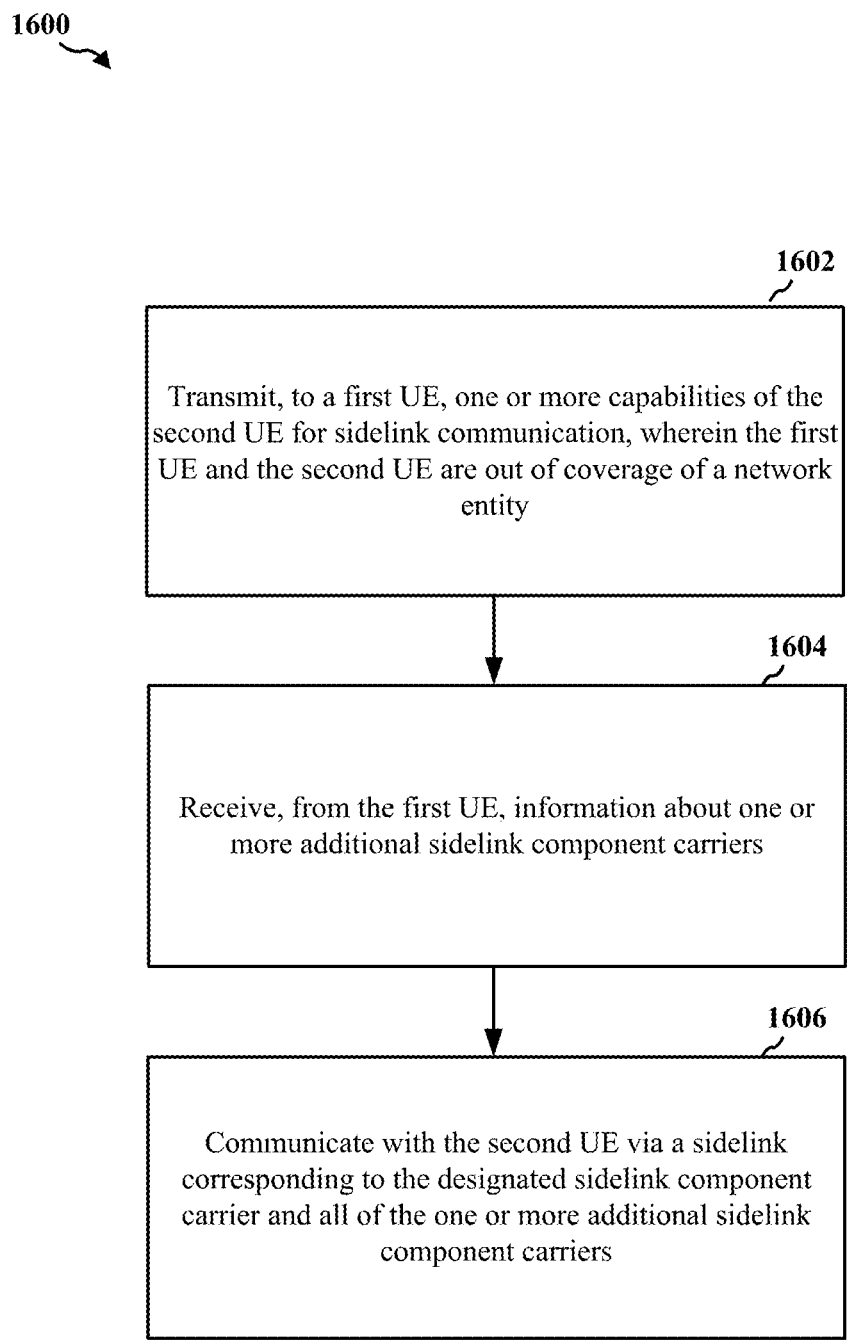
FIG. 16 is a flowchart of another example method of wireless communication of a second UE operable in the system of FIG. 1 in accordance with one or more aspects of the present disclosure.

Referring to FIG. 16, an example method 1600 of wireless communication may be performed by the UE 104a, which may include one or more components as discussed in FIG. 1, 4, or 18, and which may perform set-up, activation, and deactivation of sidelink carrier aggregation as discussed above with regard to FIGS. 1-4.

At 1602, method 1600 includes transmitting, to a first UE, one or more capabilities of the second UE for sidelink communication, wherein the first UE and the second UE are out of coverage of a network entity. For example, in an aspect, the UE 104a may operate one or any combination of antennas 1865, RF front end 1888, transceiver 1802, processor 1812, memory 1816, modem 1840, or communication component 121 in combination with the sidelink component 123 to transmit, to a first UE 104b, one or more capabilities of the second UE 104a for sidelink communication, wherein the first UE 104b and the second UE 104a are out of coverage of a network entity 102a. Thus, the UE 104b, antennas 1865, RF front end 1888, transceiver 1802, processor 1812, memory 1816, modem 1840, and communication component 121 may define the means for transmitting, to a first UE, one or more capabilities of the second UE for sidelink communication, wherein the first UE and the second UE are out of coverage of a network entity.

At 1604, method 1600 includes receiving, from the first UE, information about one or more additional sidelink component carriers. For example, in an aspect, the UE 104a may operate one or any combination of antennas 1865, RF front end 1888, transceiver 1802, processor 1812, memory 1816, modem 1840, or communication component 121 in combination with the sidelink component 123 to receive, from the first UE 104b, information about one or more additional sidelink component carriers 128. Thus, the UE 104b, antennas 1865, RF front end 1888, transceiver 1802, processor 1812, memory 1816, modem 1840, and communication component 121 may define the means for receiving, from the first UE, information about one or more additional sidelink component carriers.

At 1606, method 1600 includes communicating with the second UE via a sidelink corresponding to the designated sidelink component carrier and all of the one or more additional sidelink component carriers. For example, in an aspect, the UE 104a may operate one or any combination of antennas 1865, RF front end 1888, transceiver 1802, processor 1812, memory 1816, modem 1840, or communication component 121 in combination with the sidelink component 123 to communicate with the second UE 104a via a sidelink corresponding to the designated sidelink component carrier 124 and all of the one or more additional sidelink component carriers 128. Thus, the UE 104b, antennas 1865, RF front end 1888, transceiver 1802, processor 1812, memory 1816, modem 1840, and communication component 121 may define the means for communicating with the second UE via a sidelink corresponding to the designated sidelink component carrier and all of the one or more additional sidelink component carriers.

In an aspect of method 1600, UE 104a may configure communication component 121 and/or sidelink component 123 to determine one or more additional sidelink component carriers 128 for the first UE 104b and the second UE 104a; and wherein communicating with the second UE 104a via the sidelink corresponding to the designated sidelink component carrier 124 further comprises communicating information of the one or more additional sidelink component carriers 128 with the first UE 104b via one or more sidelink component carriers corresponding to at least one of the designated sidelink component carrier 124 or the one or more additional sidelink component carriers 128.

Figure 17:
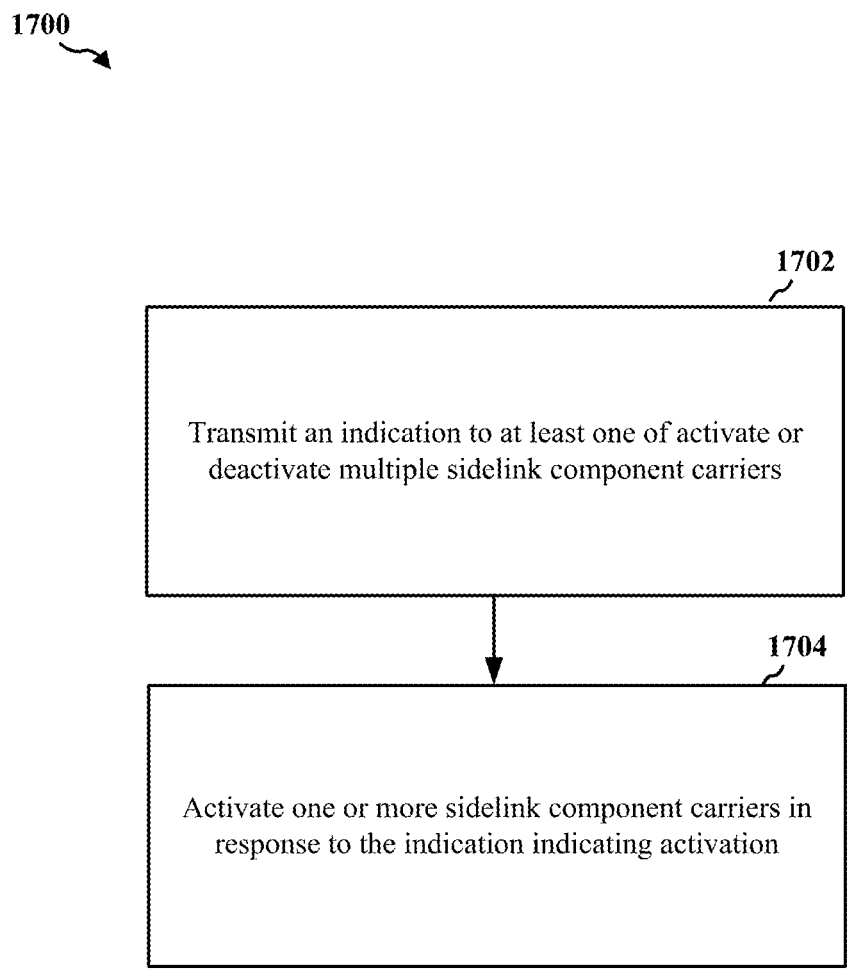
FIG. 17 is a flowchart of another example method of wireless communication of a first UE operable in the system of FIG. 1 in accordance with one or more aspects of the present disclosure.

Referring to FIG. 17, an example method 1700 of wireless communication may be performed by the UE 104b, which may include one or more components as discussed in FIG. 1, 4, or 18, and which may perform set-up, activation, and deactivation of sidelink carrier aggregation as discussed above with regard to FIGS. 1-4.

At 1702, method 1700 includes transmitting an indication to at least one of activate or deactivate multiple sidelink component carriers. For example, in an aspect, the UE 104b may operate one or any combination of antennas 1865, RF front end 1888, transceiver 1802, processor 1812, memory 1816, modem 1840, or communication component 121 in combination with the sidelink component 123 to transmit an indication to at least one of activate or deactivate multiple sidelink component carriers. Thus, the UE 104b, antennas 1865, RF front end 1888, transceiver 1802, processor 1812, memory 1816, modem 1840, and communication component 121 may define the means for transmitting an indication to at least one of activate or deactivate multiple sidelink component carriers.

At 1704, method 1700 includes activating one or more sidelink component carriers in response to the indication indicating activation. For example, in an aspect, the UE 104b may operate one or any combination of antennas 1865, RF front end 1888, transceiver 1802, processor 1812, memory 1816, modem 1840, or communication component 121 in combination with the sidelink component 123 to activate one or more sidelink component carriers in response to the indication indicating activation. Thus, the UE 104b, antennas 1865, RF front end 1888, transceiver 1802, processor 1812, memory 1816, modem 1840, and communication component 121 may define the means for activating one or more sidelink component carriers in response to the indication indicating activation.

In an aspect of method 1700, UE 104b may configure communication component 121 and/or sidelink component 123 to deactivate one or more sidelink component carriers in response to the indication indicating deactivation.

In an aspect of method 1700, the indication corresponds to at least one of a MAC CE, a DCI, or a SCI.

In an aspect of method 1700, receiving the indication to at least one of activate or deactivate the multiple sidelink component carriers further comprises receiving the at least one of the MACE CE or the DCI on a downlink channel from a network entity 102a.

Referring to FIG. 18, one example of an implementation of UE 104, including UE 104b and/or UE 104a, may include a variety of components, some of which have already been described above and are described further herein, including components such as one or more processors 1812 and memory 1816 and transceiver 1802 in communication via one or more buses 1844, which may operate in conjunction with modem 1840 and/or communication component 121 and sidelink component 123 configured to perform set-up, activation, and deactivation of sidelink carrier aggregation.

In an aspect, the one or more processors 1812 can include a modem 1840 and/or can be part of the modem 1840 that uses one or more modem processors. Thus, the various functions related to configuration component 198 may be included in modem 1840 and/or processors 1812 and, in an aspect, can be executed by a single processor, while in other aspects, different ones of the functions may be executed by a combination of two or more different processors. For example, in an aspect, the one or more processors 1812 may include any one or any combination of a modem processor, or a baseband processor, or a digital signal processor, or a transmit processor, or a receiver processor, or a transceiver processor associated with transceiver 1802. In other aspects, some of the features of the one or more processors 1812 and/or modem 1840 associated with configuration component 198 may be performed by transceiver 1802.

Also, memory 1816 may be configured to store data used herein and/or local versions of applications 1875 or communicating component 1842 and/or one or more of its subcomponents being executed by at least one processor 1812. Memory 1816 can include any type of computer-readable medium usable by a computer or at least one processor 1812, such as random access memory (RAM), read only memory (ROM), tapes, magnetic discs, optical discs, volatile memory, non-volatile memory, and any combination thereof. In an aspect, for example, memory 1816 may be a non-transitory computer-readable storage medium that stores one or more computer-executable codes defining communication component 121 and/or one or more of its subcomponents, and/or data associated therewith, when UE 104 is operating at least one processor 1812 to execute communication component 121 and/or one or more of its subcomponents.

Transceiver 1802 may include at least one receiver 1806 and at least one transmitter 1808. Receiver 1806 may include hardware and/or software executable by a processor for receiving data, the code comprising instructions and being stored in a memory (e.g., computer-readable medium). Receiver 1806 may be, for example, a radio frequency (RF) receiver. In an aspect, receiver 1806 may receive signals transmitted by at least one base station 102. Additionally, receiver 1806 may process such received signals, and also may obtain measurements of the signals, such as, but not limited to, Ec/Io, signal-to-noise ratio (SNR), reference signal received power (RSRP), received signal strength indicator (RSSI), etc. Transmitter 1808 may include hardware and/or software executable by a processor for transmitting data, the code comprising instructions and being stored in a memory (e.g., computer-readable medium). A suitable example of transmitter 1808 may including, but is not limited to, an RF transmitter.

Moreover, in an aspect, UE 104 may include RF front end 1888, which may operate in communication with one or more antennas 1865 and transceiver 1802 for receiving and transmitting radio transmissions, for example, wireless communications transmitted by at least one base station 102 or wireless transmissions transmitted by UE 104. The one or more antennas 1865 may include one or more antenna panels and/or sub-arrays, such as may be used for beamforming. RF front end 1888 may be connected to one or more antennas 1865 and can include one or more low-noise amplifiers (LNAs) 1890, one or more switches 1892, one or more power amplifiers (PAs) 1898, and one or more filters 1896 for transmitting and receiving RF signals.

In an aspect, LNA 1890 can amplify a received signal at a desired output level. In an aspect, each LNA 1890 may have a specified minimum and maximum gain values. In an aspect, RF front end 1888 may use one or more switches 1892 to select a particular LNA 1890 and its specified gain value based on a desired gain value for a particular application.

Further, for example, one or more PA(s) 1898 may be used by RF front end 1888 to amplify a signal for an RF output at a desired output power level. In an aspect, each PA 1898 may have specified minimum and maximum gain values. In an aspect, RF front end 1888 may use one or more switches 1892 to select a particular PA 1898 and its specified gain value based on a desired gain value for a particular application.

Also, for example, one or more filters 1896 can be used by RF front end 1888 to filter a received signal to obtain an input RF signal. Similarly, in an aspect, for example, a respective filter 1896 can be used to filter an output from a respective PA 1898 to produce an output signal for transmission. In an aspect, each filter 1896 can be connected to a specific LNA 1890 and/or PA 1898. In an aspect, RF front end 1888 can use one or more switches 1892 to select a transmit or receive path using a specified filter 1896, LNA 1890, and/or PA 1898, based on a configuration as specified by transceiver 1802 and/or processor 1812.

As such, transceiver 1802 may be configured to transmit and receive wireless signals through one or more antennas 1865 via RF front end 1888. In an aspect, transceiver may be tuned to operate at specified frequencies such that UE 104 can communicate with, for example, one or more base stations 102 or one or more cells associated with one or more base stations 102. In an aspect, for example, modem 1840 can configure transceiver 1802 to operate at a specified frequency and power level based on the UE configuration of the UE 104 and the communication protocol used by modem 1840.

In an aspect, modem 1840 can be a multiband-multimode modem, which can process digital data and communicate with transceiver 1802 such that the digital data is sent and received using transceiver 1802. In an aspect, modem 1840 can be multiband and be configured to support multiple frequency bands for a specific communications protocol. In an aspect, modem 1840 can be multimode and be configured to support multiple operating networks and communications protocols. In an aspect, modem 1840 can control one or more components of UE 104 (e.g., RF front end 1888, transceiver 1802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1812 may correspond to one or more of the processors described in connection with the UE in FIG. 4. Similarly, the memory 1816 may correspond to the memory described in connection with the UE in FIG. 4.

Referring to FIG. 19, one example of an implementation of base station 102 (e.g., a base station 102, 102a, and/or 102b, as described above) may include a variety of components, some of which have already been described above, but including components such as one or more processors 1912 and memory 1916 and transceiver 1902 in communication via one or more buses 1944, which may operate in conjunction with modem 1940 and base station communication component 127 configured to perform set-up, activation, and deactivation of sidelink carrier aggregation.

The transceiver 1902, receiver 1906, transmitter 1908, one or more processors 1912, memory 1916, applications 1975, buses 1944, RF front end 1988, LNAs 1990, switches 1992, filters 1996, PAs 1998, and one or more antennas 1965 may be the same as or similar to the corresponding components of UE 104, as described above, but configured or otherwise programmed for base station operations as opposed to UE operations.

In an aspect, the processor(s) 1912 may correspond to one or more of the processors described in connection with the base station in FIG. 4. Similarly, the memory 1916 may correspond to the memory described in connection with the base station in FIG. 4.

The following provides an overview of examples of the present disclosure:

Example 1. A method of wireless communication at a first UE, comprising: performing an initial beam scanning procedure with a second UE in a designated sidelink component carrier, wherein the first UE and the second UE are configured in coverage with a network entity; receiving a configuration message from the network entity indicating one or more additional sidelink component carriers for the first UE and the second UE; and communicating with the second UE via a sidelink corresponding to at least one of the one or more additional sidelink component carriers and the designated sidelink component carrier based on the configuration message.

Example 2. The method of example 1, wherein performing the initial beam scanning procedure with the second UE further comprises: transmitting a sidelink synchronization signal block (SSB) to the second UE on the designated sidelink component carrier; and establishing a sidelink beam pairing on the designated sidelink component carrier with the second UE based on the sidelink SSB.

Example 3. The method of example 1 or 2, wherein the initial beam scanning procedure includes transmission of one or more capabilities of the first UE for sidelink communication.

Example 4. The method of example 1, wherein performing the initial beam scanning procedure with the second UE further comprises: receiving a sidelink synchronization signal block (SSB) from the second UE on the designated sidelink component carrier; and establishing a sidelink beam pairing on the designated sidelink component carrier with the second UE based on the sidelink SSB.

Example 5. The method of example 1 or 4, wherein the initial beam scanning procedure includes transmission of one or more capabilities of the second UE for sidelink communication.

Example 6. The method of example 1, wherein the one or more additional sidelink component carriers for the first UE and the second UE is configured based on one or more communication capabilities for each of the first UE and the second UE.

Example 7. The method of example 1, further comprising transmitting a capability message to the network entity, the capability message indicating one or more communication capabilities of the first UE; and wherein receiving the configuration message from the network entity further comprises receiving the configuration message in response to transmitting the capability message.

Example 8. The method of example 1 or 7, wherein the capability message includes multi-component carrier configurations supported by the first UE based on performing the initial beam scanning procedure with the second UE.

Example 9. The method of example 1, 7, or 8, wherein the capability message corresponds to a Uu radio resource configuration (RRC).

Example 10. The method of example 1 or 7-9, wherein the one or more communication capabilities corresponds to a number of component carriers supported by the first UE.

Example 11. A method of wireless communication at a network entity, comprising: determining one or more additional sidelink component carriers for sidelink communication between a first user equipment (UE) and a second UE, wherein the first UE and the second UE are configured in coverage with the network entity; and transmitting a configuration message to at least one of the first UE or the second UE, the configuration message indicating the one or more additional sidelink component carriers and being configured to enable the sidelink communication between the first UE and the second UE based on one of the one or more additional sidelink component carriers.

Example 12. The method of example 11, wherein determining the one or more additional sidelink component carriers for the sidelink communication between the first UE and the second UE further comprises determining the one or more additional sidelink component carriers for the sidelink communication between the first UE and the second UE based on a number of component carriers supported by each of the first UE and the second UE.

Example 13. The method of example 11, further comprising receiving a first capability message from the first UE and a second capability message from the second UE, wherein each of the first capability message and the second capability message respectively indicate one or more communication capabilities of the first UE and the second UE.

Example 14. The method of example 11 or 13, wherein each of the first capability message and the second capability message includes a preferred multi-component carrier configuration based on an initial beam scanning procedure between the first UE and the second UE.

Example 15. The method of example 11, 13, or 14, wherein each of the first capability message and the second capability message corresponds to a Uu radio resource configuration (RRC).

Example 16. The method of example 11 or 13-15, wherein the one or more communication capabilities corresponds to a number of component carriers supported by the first UE.

Example 17. A method of wireless communication at a first user equipment (UE), comprising: performing an initial beam scanning procedure with a second UE in a designated sidelink component carrier, wherein the first UE and the second UE are configured out of coverage with a network entity; and communicating with the second UE via a sidelink corresponding to the designated sidelink component carrier.

Example 18. The method of example 17, wherein performing the initial beam scanning procedure with the second UE further comprises: transmitting a sidelink synchronization signal block (SSB) to the second UE on the designated sidelink component carrier; and establishing a sidelink beam pairing on the designated sidelink component carrier between the first UE and the second UE based on the sidelink SSB.

Example 19. The method of example 17 or 18, wherein the initial beam scanning procedure includes transmission of one or more capabilities of the first UE for sidelink communication.

Example 20. The method of example 17, wherein performing the initial beam scanning procedure with the second UE further comprises: receiving a sidelink synchronization signal block (SSB) from the second UE on the designated sidelink component carrier; and establishing a sidelink beam pairing on the designated sidelink component carrier between the first UE and the second UE based on the sidelink SSB.

Example 21. The method of example 17 or 20, wherein the initial beam scanning procedure includes transmission of one or more capabilities of the second UE for sidelink communication.

Example 22. The method of example 17, further comprising determining one or more additional sidelink component carriers for the first UE and the second UE; and wherein communicating with the second UE via a sidelink corresponding to the designated sidelink component carrier further comprises communicating the one or more additional sidelink component carriers with the second UE via one or more sidelink component carriers corresponding to at least one of the designated sidelink component carrier and the one or more additional sidelink component carriers.

Example 23. A method of wireless communication at a first user equipment (UE), comprising: performing an initial beam scanning procedure with a second UE in a designated sidelink component carrier, wherein the first UE is configured in coverage with a network entity; determining one or more additional sidelink component carriers for the first UE and the second UE, the second UE being out of coverage with the network entity; and communicating the one or more additional sidelink component carriers with the second UE via a sidelink corresponding to at least one of the one or more additional sidelink component carriers and the designated sidelink component carrier.

Example 24. The method of example 23, wherein performing the initial beam scanning procedure with the second UE further comprises: transmitting a sidelink synchronization signal block (SSB) to the second UE on the designated sidelink component carrier; and establishing a sidelink beam pairing on the designated sidelink component carrier between the first UE and the second UE based on the sidelink SSB.

Example 25. The method of example 23 or 24, wherein the initial beam scanning procedure includes transmission of one or more capabilities of the first UE for sidelink communication.

Example 26. The method of example 23, wherein performing the initial beam scanning procedure with the second UE further comprises: receiving a sidelink synchronization signal block (SSB) from the second UE on the designated sidelink component carrier; and establishing a sidelink beam pairing on the designated sidelink component carrier between the first UE and the second UE based on the sidelink SSB.

Example 27. The method of example 23 or 26, wherein the initial beam scanning procedure includes transmission of one or more capabilities of the second UE for sidelink communication.

Example 28. A method of wireless communication at a first user equipment (UE), comprising: receiving an indication to at least one of activate or deactivate multiple sidelink component carriers; determining one or more sidelink component carriers to at least one of activate or deactivate based on the indication; and performing the at least one of activation or deactivation on the one or more sidelink component carriers.

Example 29. The method of example 28, wherein the indication corresponds to at least one of a media access control (MAC) control element (CE), a downlink control information (DCI), or a sidelink control information (SCI).

Example 30. The method of example 28 or 29, wherein receiving the indication to at least one of activate or deactivate the multiple sidelink component carriers further comprises receiving the at least one of the MACE CE or the DCI on a downlink channel from a network entity.

Example 31. The method of example 28 or 29, wherein receiving the indication to at least one of activate or deactivate the multiple sidelink component carriers further comprises receiving the at least one of the MACE CE or the SCI on a sidelink component carrier from a second UE.

Example 32. The method of example 28 or 29, wherein the at least one of the MAC CE, the DCI or the SCI include a payload for indicating one or more sidelink component carriers to be at least one of activated or deactivated.

Example 33. The method of example 28 or 29, wherein the at least one of the MAC CE, the DCI or the SCI implicitly indicate one or more sidelink component carriers to be at least one of activated or deactivated.

Example 34. The method of example 28, wherein performing the at least one of activation or deactivation on the one or more sidelink component carriers further comprises performing activation on the one or more sidelink component carriers, wherein activation enables sidelink communications between the first UE and a second UE on the one or more sidelink component carriers.

Example 35. The method of example 28, wherein performing the at least one of activation or deactivation on the one or more sidelink component carriers further comprises performing deactivation on the one or more sidelink component carriers, wherein deactivation disables sidelink communications between the first UE and a second UE on the one or more sidelink component carriers.

Example 36. A method of wireless communication at a first user equipment (UE), comprising: transmitting or receiving a reference signal to or from a second UE on a designated sidelink component carrier as part of an initial beam scanning procedure; receiving a configuration message from a network entity indicating one or more additional sidelink component carriers for the first UE and the second UE; and communicating with the second UE via a sidelink corresponding to at least one of the one or more additional sidelink component carriers or the designated sidelink component carrier based on the configuration message on a sidelink beam pairing performed in the designated sidelink component carrier, wherein the first UE and the second UE are configured in coverage with the network entity.

Example 37. The method of example 36, further comprising: transmitting or receiving a sidelink synchronization signal block (SSB) to or from the second UE on the designated sidelink component carrier; and establishing a sidelink beam pairing on the designated sidelink component carrier with the second UE based on the sidelink SSB.

Example 38. The method of example 36, wherein the one or more additional sidelink component carriers for the first UE and the second UE are configured based on one or more communication capabilities for each of the first UE and the second UE.

Example 39. The method of example 36, further comprising transmitting a capability message to the network entity, the capability message indicating one or more communication capabilities of the first UE; and wherein receiving the configuration message from the network entity further comprises receiving the configuration message in response to transmitting the capability message, wherein the capability message includes multi-component carrier configurations supported by the first UE based on performing the initial beam scanning procedure with the second UE, wherein the capability message corresponds to a Uu radio resource configuration (RRC) message, wherein the one or more communication capabilities correspond to a number of component carriers supported by the first UE.

Example 40. A method of wireless communication at a network entity, comprising: receiving a first capability message from a first UE and a second capability message from the second UE, wherein each of the first capability message and the second capability message respectively indicate one or more communication capabilities of the first UE and the second UE; and transmitting a configuration message to at least one of the first UE or the second UE, the configuration message indicating the one or more additional sidelink component carriers and enabling the sidelink communication between the first UE and the second UE based on one of the one or more additional sidelink component carriers, wherein the first UE and the second UE are in coverage with the network entity.

Example 41. The method of example 40, wherein the one or more additional sidelink component carriers for the sidelink communication between the first UE and the second UE are based on a number of component carriers supported by each of the first UE and the second UE.

Example 42. The method of example 40, wherein each of the first capability message and the second capability message includes a preferred multi-component carrier configuration based on an initial beam scanning procedure between the first UE and the second UE.

Example 43. The method of example 40, wherein each of the first capability message and the second capability message corresponds to a respective Uu radio resource configuration (RRC).

Example 44. The method of example 40, wherein the one or more communication capabilities corresponds to a number of component carriers supported by the first UE.

Example 45. A method of wireless communication at a first user equipment (UE), comprising: receiving one or more capabilities of a second UE for sidelink communication, wherein the first UE and the second UE are out of coverage of a network entity; transmitting, to the second UE, information about one or more additional sidelink component carriers; and communicating with the second UE via a sidelink corresponding to the designated sidelink component carrier and with the one or more additional sidelink component carriers.

Example 46. The method of example 45, further comprising: transmitting or receiving a sidelink synchronization signal block (SSB) to or from the second UE on the designated sidelink component carrier; and establishing a sidelink beam pairing on the designated sidelink component carrier between the first UE and the second UE based on the sidelink SSB.

Example 47. The method of examples 45 and 46, further comprising determining one or more additional sidelink component carriers for the first UE and the second UE.

Example 48. A method of wireless communication at a first user equipment (UE), comprising: transmitting a reference signal to a second UE on a designated sidelink component carrier as part of an initial beam scanning procedure; determining one or more additional sidelink component carriers for the first UE and the second UE; and communicating with the second UE via a sidelink corresponding to at least one of the one or more additional sidelink component carriers or the designated sidelink component carrier based on a configuration message on a sidelink beam pairing based on the designated signal, wherein the first UE is in coverage of a network entity and the second UE being out of coverage of the network entity.

Example 49. The method of example 48, further comprising: receiving a sidelink synchronization signal block (SSB) from the second UE on the designated sidelink component carrier; and establishing a sidelink beam pairing on the designated sidelink component carrier with the second UE based on the sidelink SSB.

Example 50. A method of wireless communication at a first user equipment (UE), comprising: receiving an indication to at least one of activate or deactivate multiple sidelink component carriers; and activating one or more sidelink component carriers in response to the indication indicating activation.

Example 51. The method of example 50, further comprising deactivating one or more sidelink component carriers in response to the indication indicating deactivation.

Example 52. The method of claim 50, wherein the indication corresponds to at least one of a media access control (MAC) control element (CE), a downlink control information (DCI), or a sidelink control information (SCI).

Example 53. The method of examples 50 and 51, wherein receiving the indication to at least one of activate or deactivate the multiple sidelink component carriers further comprises receiving the at least one of the MACE CE or the DCI on a downlink channel from a network entity.

Example 54. The method of examples 50 and 51, wherein receiving the indication to at least one of activate or deactivate the multiple sidelink component carriers further comprises receiving the at least one of the MACE CE or the SCI on a sidelink component carrier from a second UE.

Example 55. The method of examples 50 and 51, wherein the at least one of the MAC CE, the DCI or the SCI include a payload for indicating one or more sidelink component carriers to be at least one of activated or deactivated.

Example 56. The method of examples 50 and 51, wherein the at least one of the MAC CE, the DCI or the SCI implicitly indicate one or more sidelink component carriers to be at least one of activated or deactivated.

Example 57. The method of example 50, wherein performing the at least one of activation or deactivation on the one or more sidelink component carriers further comprises performing activation on the one or more sidelink component carriers, wherein activation enables sidelink communications with a second UE on the one or more sidelink component carriers.

Example 58. The method of example 50, wherein performing the at least one of activation or deactivation on the one or more sidelink component carriers further comprises performing deactivation on the one or more sidelink component carriers, wherein deactivation disables sidelink communications with a second UE on the one or more sidelink component carriers.

Example 59. A method of wireless communication at a second user equipment (UE), comprising: transmitting, to a first UE, one or more capabilities of the second UE for sidelink communication, wherein the first UE and the second UE are out of coverage of a network entity; receiving, from the first UE, information about one or more additional sidelink component carriers; and communicating with the second UE via a sidelink corresponding to the designated sidelink component carrier and all of the one or more additional sidelink component carriers.

Example 60. The method of example 59, further comprising: transmitting or receiving a sidelink synchronization signal block (SSB) to the first UE on the designated sidelink component carrier; and establishing a sidelink beam pairing on the designated sidelink component carrier with the first UE based on the sidelink SSB.

Example 61. The method of example 59, further comprising determining one or more additional sidelink component carriers for the first UE and the second UE; and wherein communicating with the second UE via the sidelink corresponding to the designated sidelink component carrier further comprises communicating information of the one or more additional sidelink component carriers with the first UE via one or more sidelink component carriers corresponding to at least one of the designated sidelink component carrier or the one or more additional sidelink component carriers.

Example 62. A method of wireless communication at a first user equipment (UE), comprising: transmitting an indication to at least one of activate or deactivate multiple sidelink component carriers; and activating one or more sidelink component carriers in response to the indication indicating activation.

Example 63. The method of example 62, further comprising deactivating one or more sidelink component carriers in response to the indication indicating deactivation.

Example 64. The method of example 62, wherein the indication corresponds to at least one of a media access control (MAC) control element (CE), a downlink control information (DCI), or a sidelink control information (SCI).

Example 65. The method of examples 62 and 64, wherein receiving the indication to at least one of activate or deactivate the multiple sidelink component carriers further comprises receiving the at least one of the MACE CE or the DCI on a downlink channel from a network entity.

Example 66. An apparatus for wireless communication, comprising: a memory and one or more processors, the memory and the one or more processors being configured to perform the operations of one or more methods in example 1-65.

Example 67. An apparatus for wireless communication, comprising means for performing the operations of one or more methods in example 1-65.

Example 68. A non-transitory computer-readable medium, comprising code executable by one or more processors to perform the operations of one or more methods in example 1-65.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
    transmitting or receiving a reference signal to or from a second UE on a designated sidelink component carrier as part of an initial beam scanning procedure;
    transmitting a capability message to a network entity, the capability message indicating one or more communication capabilities of the first UE, wherein the capability message includes multi-component carrier configurations supported by the first UE based on performing the initial beam scanning procedure with the second UE;
    receiving a configuration message from the network entity indicating one or more additional sidelink component carriers for the first UE and the second UE; and
    communicating with the second UE via a sidelink corresponding to at least one of the one or more additional sidelink component carriers or the designated sidelink component carrier based on the configuration message on a sidelink beam pairing performed in the designated sidelink component carrier,
    wherein the first UE and the second UE are configured in coverage with the network entity.

2. The method of claim 1, further comprising:
transmitting or receiving a sidelink synchronization signal block (SSB) to or from the second UE on the designated sidelink component carrier; and
establishing a sidelink beam pairing on the designated sidelink component carrier with the second UE based on the sidelink SSB.

3. The method of claim 1, wherein the one or more additional sidelink component carriers for the first UE and the second UE are configured based on one or more communication capabilities for each of the first UE and the second UE.

4. The method of claim 1,
wherein receiving the configuration message from the network entity further comprises receiving the configuration message in response to transmitting the capability message, wherein the capability message corresponds to a Uu radio resource configuration message, wherein the one or more communication capabilities correspond to a number of component carriers supported by the first UE.

5. A method of wireless communication at a network entity, comprising:
receiving a first capability message from a first UE and a second capability message from a second UE, wherein each of the first capability message and the second capability message respectively indicate one or more communication capabilities of the first UE and the second UE; and
transmitting a configuration message to at least one of the first UE or the second UE, the configuration message indicating one or more additional sidelink component carriers and enabling a sidelink communication between the first UE and the second UE based on one of the one or more additional sidelink component carriers,
wherein the first UE and the second UE are in coverage with the network entity, and
wherein each of the first capability message and the second capability message includes a multi-component carrier configuration based on an initial beam scanning procedure between the first UE and the second UE.

6. The method of claim 5, wherein the one or more additional sidelink component carriers for the sidelink communication between the first UE and the second UE are based on a number of component carriers supported by each of the first UE and the second UE.

7. The method of claim 5, wherein each of the first capability message and the second capability message corresponds to a respective Uu radio resource configuration.

8. The method of claim 5, wherein the one or more communication capabilities correspond to a number of component carriers supported by the first UE.

9. A method of wireless communication at a first user equipment (UE), comprising:
receiving one or more capabilities of a second UE for sidelink communication based on an initial beam scanning procedure between the first UE and the second UE, wherein the first UE and the second UE are out of coverage of a network entity;
transmitting, to the second UE, information about one or more additional sidelink component carriers; and
communicating with the second UE via a sidelink corresponding to a designated sidelink component carrier and the one or more additional sidelink component carriers.

10. The method of claim 9, further comprising:
transmitting or receiving a sidelink synchronization signal block (SSB) to or from the second UE on the designated sidelink component carrier; and
establishing a sidelink beam pairing on the designated sidelink component carrier between the first UE and the second UE based on the sidelink SSB.

11. The method of claim 10, further comprising determining the one or more additional sidelink component carriers for the first UE and the second UE.

12. A method of wireless communication at a second user equipment (UE), comprising:
transmitting, to a first UE, via an initial beam scanning procedure between the first UE and the second UE, one or more capabilities of the second UE for sidelink communication, wherein the first UE and the second UE are out of coverage of a network entity;
receiving, from the first UE, information about one or more additional sidelink component carriers; and
communicating with the first UE via a sidelink corresponding to a designated sidelink component carrier and all of the one or more additional sidelink component carriers.

13. The method of claim 12, further comprising:
transmitting or receiving a sidelink synchronization signal block (SSB) to or from the first UE on the designated sidelink component carrier; and
establishing a sidelink beam pairing on the designated sidelink component carrier with the first UE based on the sidelink SSB.

14. The method of claim 12, further comprising determining the one or more additional sidelink component carriers for the first UE and the second UE.

* * * * *